(12) United States Patent
Cui et al.

(10) Patent No.: US 12,143,228 B2
(45) Date of Patent: Nov. 12, 2024

(54) ELECTRONIC DEVICE, COMMUNICATION METHOD AND STORAGE MEDIUM

(71) Applicant: Sony Group Corporation, Tokyo (JP)

(72) Inventors: Tao Cui, Beijing (CN); Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/773,035

(22) PCT Filed: Nov. 3, 2020

(86) PCT No.: PCT/CN2020/126097
§ 371 (c)(1),
(2) Date: Apr. 29, 2022

(87) PCT Pub. No.: WO2021/088789
PCT Pub. Date: May 14, 2021

(65) Prior Publication Data
US 2024/0171325 A1    May 23, 2024

(30) Foreign Application Priority Data
Nov. 8, 2019  (CN) .......................... 201911089379.7

(51) Int. Cl.
*H04L 1/1867* (2023.01)
*H04L 1/1607* (2023.01)

(52) U.S. Cl.
CPC .......... *H04L 1/1887* (2013.01); *H04L 1/1678* (2013.01)

(58) Field of Classification Search
None
See application file for complete search history.

(56) References Cited

U.S. PATENT DOCUMENTS

| 2019/0306878 | A1 | 10/2019 | Zhang et al. |
| 2019/0342911 | A1 | 11/2019 | Talarico |
| 2020/0145973 | A1* | 5/2020 | Lin ........................ H04L 1/1812 |

(Continued)

FOREIGN PATENT DOCUMENTS

| CN | 109565839 A | 4/2019 |
| CN | 109964441 A | 7/2019 |
| EP | 2306665 A1 | 4/2011 |

OTHER PUBLICATIONS

International Search Report and Written Opinion mailed on Jan. 29, 2021, received for PCT Application PCT/CN2020/126097, Filed on Nov. 3, 2020, 9 pages including English Translation.

(Continued)

*Primary Examiner* — Benjamin Lamont
(74) *Attorney, Agent, or Firm* — XSENSUS LLP

(57) ABSTRACT

The present disclosure relates to electronic device, communication method and storage medium in a wireless communication system. There is provided an electronic device on side of a user device, comprising a processing circuitry configured to: transmit a plurality of signals to a control device sequentially over consecutive slots, each of the signals including repetitive user data; and at a timing after a preconfigured duration has elapsed from a completion of the transmission of the first signal of the plurality of signals, receive one or more HARQ feedbacks which indicate whether a decoding for the user data by the control device is successful or not.

8 Claims, 10 Drawing Sheets

(56) References Cited

U.S. PATENT DOCUMENTS

| | | | |
|---|---|---|---|
| 2021/0099348 A1* | 4/2021 | Bhattad | H04W 74/04 |
| 2022/0014314 A1* | 1/2022 | Wang | H04L 5/0053 |
| 2022/0216954 A1* | 7/2022 | Lin | H04L 1/1851 |
| 2022/0416957 A1* | 12/2022 | Shao | H04L 1/1896 |

OTHER PUBLICATIONS

Huawei et al., "Transmission with configured grant in NR unlicensed band", 3GPP TSG RAN WG1 Meeting #98bis, R1-1910048, Oct. 14-20, 2019, 22 pages.

Samsung, "Enhancements on configured grant for NR-U", 3GPP TSG RAN WG1 #98bis, R1-1910462, Oct. 14-20, 2019, 5 pages.

Sony, "Enhancements to Configured Grants in NR-U", 3GPP TSG RAN WG1 meeting #99, R1-1912342, Nov. 18-22, 2019, 6 pages.

Vivo: "Feature lead summary on Configured grant enhancement, " 3GPP TSG RAN WG1 #98bis, R1-1910559, Chongqing, China, Oct. 14-20, 2019, agenda item 7.2.2.4, pp. 1-20.

"R1-1911100 7.2.2.2.4 Enhancements to configured grants for NR-U" 3GPP tsg_ran\wg1_rl1, Oct. 5, 2019.

ZTE, Sanechips, R1-1909977 "Discussion on configured grant for NRR-U" 3GPP tsg_ran\wg1_rl1, tsgr1_98b, Oct. 7, 2019.

* cited by examiner

| | Reception start timing of HARQ-ACK | | |
|---|---|---|---|
| | $t_{end}$ ~ $t_{end}+D$ | $t_{end}+D$ ~ $t_{end}+D+(repk-1)T_{slot}$ | $t_{end}+D+(repk-1)T_{slot}$ ~ |
| ACK | Not receive | Valid | Valid |
| NACK | Not receive | Invalid | Valid |

ELECTRONIC DEVICE, COMMUNICATION METHOD AND STORAGE MEDIUM

CROSS-REFERENCE TO RELATED APPLICATIONS

The present application is based on PCT filing PCT/CN2020/126097, filed Nov. 3, 2020, which claims priority to Chinese Patent Application No. 201911089379.7, filed Nov. 8, 2019, the entire contents of each are incorporated herein by reference.

FIELD OF THE INVENTION

The present disclosure relates to an electronic device, a communication method, and a storage medium, and in particular, to an electronic device, a communication method, and a storage medium for a feedback process of uplink repetitive transmissions using slot aggregation.

BACKGROUND

Many mobile application services are increasingly popular due to the development of wireless communication technologies. The requirements for the wireless communication have their own emphasis depending on different types of the services. As the next-generation communication technology, the 5G New Radio (NR) considers three important application scenarios: enhanced mobile broadband (eMBB), massive machine type communication (mMTC), and ultra-reliable low-latency communication (URLLC). These application scenarios have corresponding requirements for reliability and latency of the data transmission.

Similar to the 4G Long Term Evolution (LTE), hybrid automatic repeat request (HARQ) mechanism at Medium Access Control (MAC) layer is introduced into the 5G NR communication system to ensure reliability of the data transmission. HARQ is a technology combining Forward Error Correction (FEC) method with Automatic Repeat reQuest (ARQ) method, wherein the FEC enables a receiver to correct a part of errors by adding redundant information to the data to be transmitted, thereby reducing the number of retransmissions, and the receiver feeds back a HARQ acknowledgement (HARQ-ACK) to the transmitter depending on a result of the error detection for the received data. For an error that cannot be corrected by the FEC, the receiver may request the transmitter to retransmit the data through the ARQ mechanism.

For uplink data transmission, 3GPP RAN1 #98 defines a minimum duration D for a user device to wait for receiving Downlink Feedback Information (DFI), i.e., a duration from an ending symbol of the transmission to a starting symbol of the Downlink Feedback Information (DFI) carrying a HARQ-ACK. In a case where a single slot or mini-slot is used as the basic scheduling unit for the time-domain resource, the user device only needs to confirm validity of the HARQ-ACK for this uplink transmission which is received after the duration D has elapsed from the completion of the uplink transmission.

However, there is also a specific case of repetitive transmissions using slot aggregation, that is, repetitive user data is transmitted over a consecutive plurality of slots (aggregation slots). A minimum duration D applicable to such a scenario is not currently defined. In addition, since the specific decoding process on the base station side is unknown to the user device, the user device does not know whether the received feedback about the decoding result is for all aggregated slots or for a part of the aggregated slots, and cannot determine the validity of the feedback, so that the subsequent behavior cannot be determined.

Therefore, for the uplink repetitive transmissions using the slot aggregation, a suitable minimum duration D needs to be defined, and the operations performed by both of the base station and the user device in the HARQ feedback process need to be improved.

SUMMARY OF THE INVENTION

With respect to the above-mentioned problem and others, the present disclosure provides various aspects of a feedback process applicable to the uplink repetitive transmissions using the slot aggregation.

A brief overview regarding the present disclosure is given below to provide a basic understanding on some aspects of the present disclosure. However, it will be appreciated that the overview is not an exhaustive description of the present disclosure. It is not intended to specify key portions or important portions of the present disclosure, nor to limit the scope of the present disclosure. It aims at merely describing some concepts about the present disclosure in a simplified form and serves as a preorder of a more detailed description to be given later.

According to one aspect of the present disclosure, there is provided an electronic device on side of a user device, comprising: a processing circuitry configured to transmit a plurality of signals to a control device sequentially over consecutive slots, each of the signals including repetitive user data; and at a timing after a preconfigured duration has elapsed from a completion of the transmission of the first signal of the plurality of signals, receive one or more HARQ feedbacks which indicate whether a decoding for the user data by the control device is successful or not.

According to another aspect of the present disclosure, there is provided an electronic device on side of a control device, comprising: a processing circuitry configured to receive a plurality of signals from a user device sequentially over consecutive slots, each of the signals including repetitive user data; perform decoding for the user data with at least one of the plurality of signals; and at a timing after a preconfigured duration has elapsed from a completion of the transmission of the first signal of the plurality of signals, transmit to the user device one or more HARQ feedbacks which indicate whether the decoding is successful or not.

According to another aspect of the present disclosure, there is provided a communication method comprising: transmitting a plurality of signals to a control device sequentially over consecutive slots, each of the signals including repetitive user data, and at a timing after a preconfigured duration has elapsed from a completion of the transmission of the first signal of the plurality of signals, receiving one or more HARQ feedbacks which indicate whether a decoding for the user data by the control device is successful or not.

According to another aspect of the present disclosure, there is provided a communication method comprising: receiving a plurality of signals from a user device sequentially over consecutive slots, each of the signals including repetitive user data; performing decoding for the user data with at least one of the plurality of signals; and at a timing after a preconfigured duration has elapsed from a completion of the transmission of the first signal of the plurality of signals, transmitting to the user device one or more HARQ feedbacks which indicate whether the decoding is successful or not.

According to another aspect of the present disclosure, there is provided a non-transitory computer readable storage medium storing executable instructions which, when executed, implement any of the methods as described above.

According to one or more embodiments of the present application, an appropriate HARQ feedback process may be applied in the scenario of uplink repetitive transmissions using the slot aggregation.

DESCRIPTION OF THE DRAWINGS

A better understanding of the present disclosure may be achieved by referring to a detailed description given hereinafter in connection with accompanying drawings, wherein the same or similar reference signs are used to indicate the same or similar elements throughout the drawings. The drawings are included in the specification and form a part of the specification along with the following detailed descriptions, for further illustrating embodiments of the present disclosure and for explaining the theory and advantages of the present disclosure. Wherein.

Further features of the present invention will become apparent from the following description of exemplary embodiments with reference to the attached drawings.

DETAILED DESCRIPTION OF PREFERRED EMBODIMENTS

Various illustrative embodiments of the present disclosure will be described hereinafter with reference to the drawings. For purpose of clarity and simplicity, not all features are described in the specification. Note that, however, many settings specific to the implementations can be made in practicing the embodiments of the present disclosure according to specific requirements, so as to achieve specific goals of the developers, for example, to comply with the limitations related to apparatus and service, and these limitations may vary from implementations. Furthermore, it will be appreciated that the developing work will be a routine task, despite complex and tedious, for those skilled in the art who benefit from the present disclosure.

In addition, it should be noted that in order to avoid obscuring the present disclosure due to unnecessary details, some of the figures illustrate only steps of a process and/or components of a device that are closely related to the technical solutions of the present disclosure, while in some other figures, existing process steps and/or device structures are additionally shown for the better understanding of the present disclosure.

Illustrative embodiments and application examples of the present disclosure will be described in detail with reference to the figures. The following description of the illustrative embodiments are merely explanatory and is not intended to be any limitation to the present disclosure and the applications thereof.

For convenient explanation, various aspects of the present disclosure will be described below in the context of the 5G NR. However, it should be noted that this is not a limitation on the scope of application of the present disclosure, and one or more aspects of the present disclosure can also be applied to wireless communication systems that have been commonly used, such as the 4G LTE/LTE-A, or various wireless communication systems to be developed in future. Equivalents to the architecture, entities, functions, processes and the like as described in the following description may be found in the NR communication system or other communication standards.

[Overview of the System]

Figure 1:
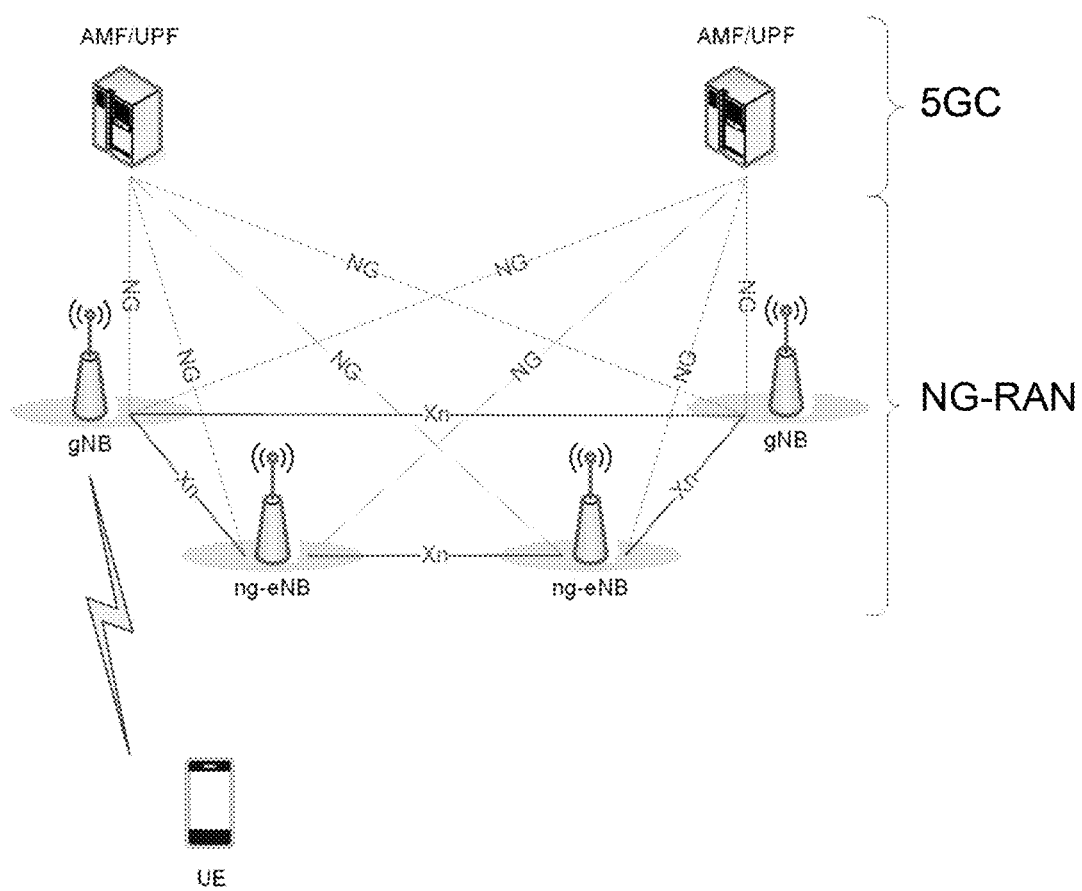
FIG. 1 is a simplified diagram illustrating an architecture of an NR communication system.

FIG. 1 is a simplified diagram showing the architecture of the 5G NR communication system. As shown in FIG. 1, on the network side, radio access network (NG-RAN) nodes of the NR communication system include gNBs and ng-eNBs, wherein the gNB is a node newly defined in the 5G NR communication standard, is connected to a 5G core network (5 GC) via an NG interface, and provides NR user plane and control plane protocols terminating with a terminal device (which may also be referred to as "user device", hereinafter simply referred to as "UE"); the ng-eNB is a node defined for compatibility with the 4G LTE communication system, may be an upgrade of an evolved NodeB (eNB) of the LTE radio access network, connects the device to the 5G core network via the NG interface, and provides evolved universal terrestrial radio access (E-UTRA) user plane and control plane protocols terminating with the UE. Between NG-RAN nodes (e.g., gNBs, ng-eNBs) there is an Xn interface to facilitate intercommunication between the nodes. The gNB and ng-eNB are collectively referred to as a "base station" hereinafter.

It should be noted, however, that the term "base station" as used in the present disclosure is not limited to only the above two kinds of nodes, but is an example of a control device in a wireless communication system, with its full breadth of ordinary meaning. For example, in addition to the gNB and ng-eNB specified in the 5G communication standard, the "base station" may also be, for example, an eNB in the LTE communication system, a remote radio head, a wireless access point, a relay node, a drone control tower, a control node in an automated plant, or a communication device or an element thereof for performing a similar control function, depending on the scenario in which the technical solution of the present disclosure is applied. The following sections will describe application examples of the base station in detail.

In addition, the term "UE" as used in the present disclosure has its full breadth of general meaning, including various terminal devices or vehicle-mounted devices that communicate with a base station. By way of example, the UE may be a terminal device or an element thereof such a mobile phone, a laptop, a tablet, a vehicle communication device, a drone, a sensor and an actuator in an automated plant, or the like. The following sections will describe application examples of the UE in detail.

Figure 2A:
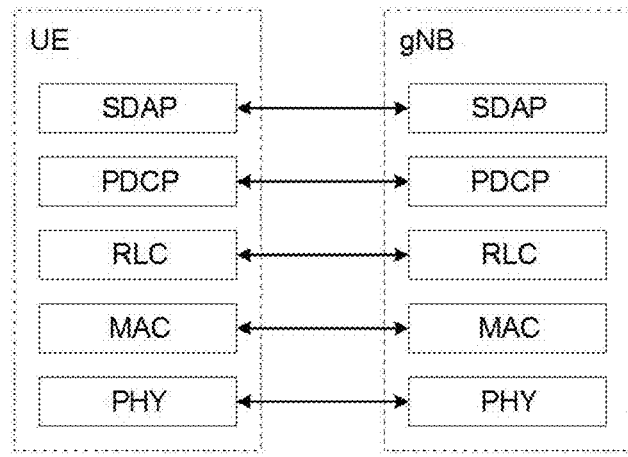
FIGS. 2A and 2B illustrate NR radio protocol architectures for a user plane and a control plane, respectively.
Figure 2B:
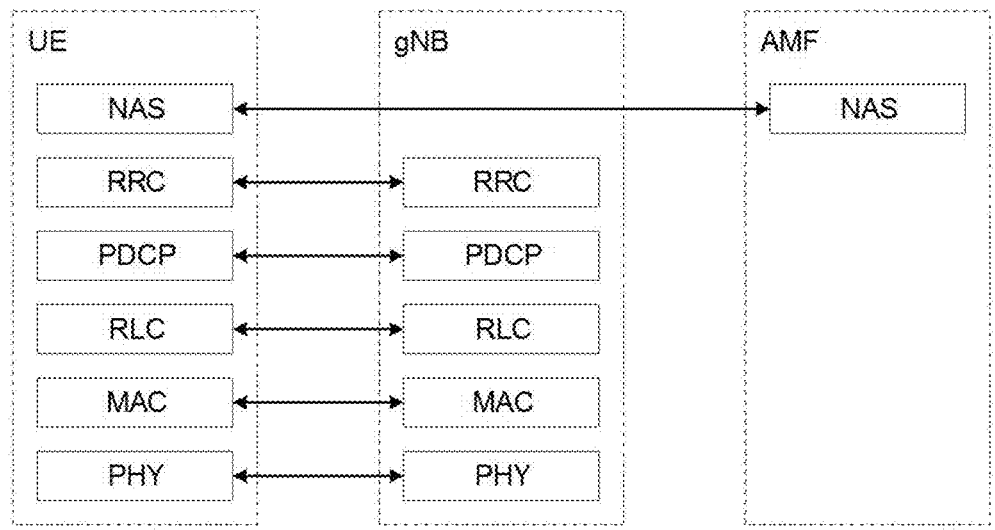

The NR radio protocol architecture for the base station and the UE in FIG. 1 is described next in conjunction with FIGS. 2A and 2B. FIG. 2A shows a radio protocol stack for the user plane of the UE and the base station, and FIG. 2B shows a radio protocol stack for the control plane of the UE and the base station.

Layer 1 (L1) of the radio protocol stack is the lowest layer, also referred to as the physical layer. The L1 layer implements a variety of physical layer signal processes to provide a transparent transmission function for signals.

Layer 2 (L2) of the radio protocol stack is above the physical layer and is responsible for managing a radio link between the UE and the base station. In the user plane, the L2 layer includes a Medium Access Control (MAC) sublayer, a Radio Link Control (RLC) sublayer, a Packet Data Convergence Protocol (PDCP) sublayer, and a Service Data Adaptation Protocol (SDAP) sublayer. In addition, in the control plane, the L2 layer includes a MAC sublayer, an RLC sublayer, and a PDCP sublayer.

The relationship among these sublayers is: the physical layer provides a transport channel for the MAC sublayer, including, for example, Physical Uplink Shared Channel (PUSCH), Physical Uplink Control Channel (PUCCH), and Physical Random Access Channel (PRACH) in an uplink direction, and Physical Downlink Shared Channel (PDSCH), Physical Downlink Control Channel (PDCCH), and Physical Broadcast Channel (PBCH) in a downlink direction: the MAC sublayer provides a logical channel for the RLC sublayer, such as Uplink Shared Channel (UL-SCH), Random Access Channel (RACH), Downlink Shared Channel (DL-SCH), Broadcast Channel (BCH), Paging Channel (PCH), or the like; the RLC sublayer provides a RLC channel for the PDCP sublayer, which in turn provides a radio bearer for the SDAP sublayer. In particular, the MAC sublayer is responsible for allocating various radio resources (e.g., time-frequency resource blocks) in one cell among the various UEs.

In the control plane, a Radio Resource Control (RRC) sublayer in layer 3 (L3) is also included in the UE and the base station. The RRC sublayer is responsible for obtaining radio resources (i.e., radio bearers) and for configuring the lower layers using RRC signaling. In addition, a non-access stratum (NAS) control protocol in the UE performs functions such as authentication, mobility management, security control, and the like.

The procedure of the uplink data transmission is briefly described below. The uplink data transmission from the UE to the base station is done through the PUSCH. The 5G NR generally supports two uplink transmission schemes: a codebook-based transmission and a non-codebook-based transmission. For the codebook-based transmission, the base station provides the UE with a Transmit Precoding Matrix Indication (TPMI) in Downlink Control Information (DCI), which can be used by the UE to select a PUSCH transmission precoder from a codebook. For the non-codebook based transmission, the UE determines its PUSCH transmission precoder based on a wideband SRS Resource Indicator (SRI) field in the DCI.

User data from the MAC layer is treated as "Transport Blocks (TBs)" and needs to undergo a series of uplink physical layer processes in order to be mapped to a transport channel at the physical layer. The uplink physical layer processes generally include:

Cyclic Redundancy Check (CRC) addition to the transport block, in which the entire transport block from the UL-SCH is used to calculate CRC check bits, and the calculated check bits are added to the transport block;

code block segmentation and code block CRC addition, in which the transport block is segmented into a number of code blocks, check bits are calculated based on each code block, and the calculated check bits are added to the respective code block;

channel coding, in which each of the code blocks is Low Density Parity Check (LDPC) coded, respectively;

HARQ processing at the physical layer;

rate matching, the rate matching of the LDPC code being defined for each coded block and comprising bit selection and bit interleaving;

scrambling, which may be with, for example, C-RNTI, new RNTI, TC-RNTI, CS-RNTI, SP-CSI-RNTI or the like of the UE;

modulation, including π/2 Binary Phase Shift Keying (BPSK), Quadrature Phase Shift Keying (QPSK), 16 quadrature amplitude modulation (16 QAM), 64QAM and 256 QAM;

layer mapping, transform precoding and precoding;

mapping to allocated resources and antenna ports.

With the aid of various signal processing functions at the physical layer, a bit stream as the user data is encoded and modulated into OFDM symbols, and is transmitted by an antenna array to the serving base station by using the allocated time-frequency resources. The base station receiving the signal decodes the user data through an inverse of the above signal processes.

Figure 3:
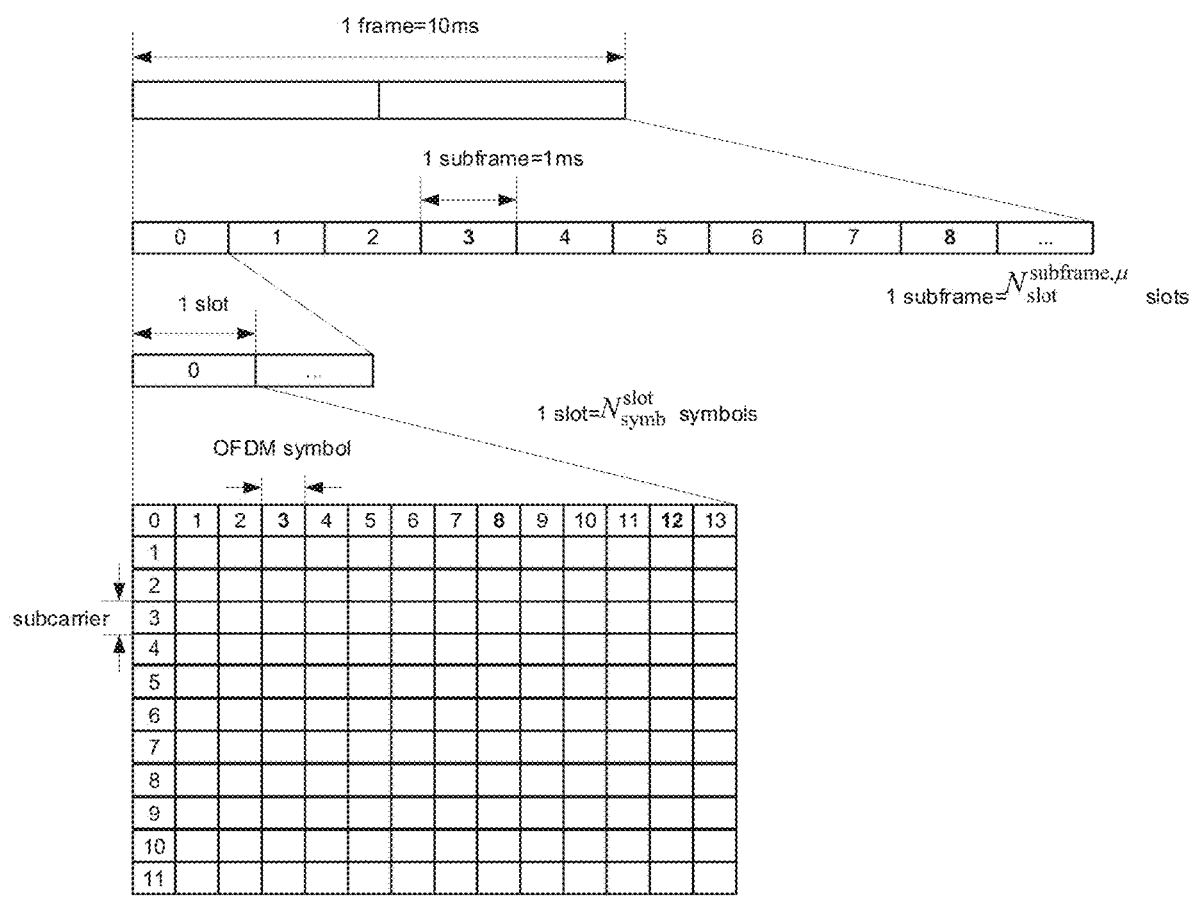
FIG. 3 illustrates a frame structure used in the 5G NR.

In the 5G NR, both of the downlink and uplink transmissions are organized into frames. FIG. 3 shows a diagram of a frame structure in the 5G communication system. As a fixed framework compatible with the LTE/LTE-A, a frame in the NR also has a length of 10 ms and comprises 10 equally sized subframes each of which is of 1 ms. Unlike the LTE/LTE-A, the frame structure in the NR has a flexible framework that depends on the subcarrier spacing. Each subframe has a configurable number of slots, e.g., 1, 2, 4, 8 or 16. Each slot also has a configurable number of OFDM symbols, with each slot containing 14 consecutive OFDM symbols for a normal cyclic prefix or 12 consecutive OFDM symbols for an extended cyclic prefix. In the frequency-domain dimension, each slot comprises several resource blocks, each resource block containing, for example, 12 consecutive subcarriers in the frequency domain. Thus, the Resource Elements (REs) in a slot may be represented using a resource grid, as shown in FIG. 3. The resource blocks available for uplink transmission may be divided into a data section and a control section. Resource elements in the control section may be allocated to the UE for transmission of control information. The data section may include all resource elements that are not included in the control section. The UE may also be allocated with resource elements in the data section for transmitting data to the base station.

The UE having data to transmit may transmit a Scheduling Request (SR) and/or a Buffer Status Report (BSR) to the base station to request time-frequency resources for transmitting the user data. In a scheme where the resources are dynamically granted, the base station may dynamically schedule the PUSCH using DCI including resource allocation information. In a resource scheduling scheme where the grant is configured, the base station can pre-configure available time-frequency resources for the UE through RRC layer signaling, so that the UE can directly utilize the pre-configured time-frequency resources to carry out the PUSCH transmission without requesting the base station to send the uplink grant every time.

In most cases, the scheduling of the time-domain resources is on basis of a single slot or mini-slot. However, there is a kind of scheduling that utilizes an aggregation of time slots, i.e., scheduling a number of consecutive slots (aggregated slots) for the downlink or uplink data transmission for the UE at one time. The slot aggregation may typically be used for repetitive transmissions of data. For example, in case of the configured grant as described above, by configuring the parameter repK in the RRC layer signaling ConguredGrantConfig to, for example, 1, 2, 4 or 8, the UE may repetitively transmit the same data on a corresponding number of consecutive slots during the PUSCH transmission, so as to guarantee the reliability of data transmission, for example, when the channel condition is poor.

However, the feedback process for the aforementioned repetitive transmissions is not specified in the industry.

On the one hand, RAN1#98 has defined a minimum duration D configured by RRC layer signaling, which is from an ending symbol of a PUSCH transmission to a starting symbol of Downlink Feedback Information (DFI) carrying a HARQ-ACK for that PUSCH transmission. The reason for configurating the minimum duration D is that a certain time is required for the reception and decoding at the base station, so the feedback cannot be immediately provided to the UE. By configuring this parameter, after the completion of the PUSCH transmission, the UE may leave its communication module idle for a time period corresponding to the minimum duration D to reduce its energy consumption, or may perform other transmitting or receiving tasks by using its communication module within the time period corresponding to the minimum duration D, without having to monitor the channel all the time to wait for receiving the HARQ-ACK. However, the minimum duration D as defined is only for non-repetitive PUSCH transmissions, since such minimum duration D has not been defined for repetitive PUSCH transmissions. This means that the UE needs to monitor the channel all the time after the completion of the PUSCH transmission, which is not beneficial to the energy saving and working efficiency of the communication module. If like in the non-repetitive PUSCH transmission, the period from the ending symbol of the repetitive PUSCH transmissions to the starting symbol of the DFI carrying the HARQ-ACK is defined as the minimum duration D, it means that even if the base station has decoded the user data with the signal transmitted in the first slot, it needs to wait for the completion of the transmissions in all slots as well as the configured minimum duration D before transmitting the HARQ-ACK to the UE, which certainly increases the latency.

On the other hand, the decoding process at the base station is agnostic to the UE, i.e. the UE does not know whether the HARQ-ACKs provided by the base station are for all or a part of the aggregated slots. For example, suppose that the base station fails to decode the user data based on the signal transmitted in the first slot, and sends a NACK to the UE indicating that the decoding is unsuccessful, however, the UE cannot determine the validity of the NACK it has received, because the UE does not know whether the NACK means whether the user data could not be successfully decoded using the signals transmitted in all aggregated slots and therefore needs to be retransmitted, or the user data is unsuccessfully decoded so far and therefore needs to wait for a possible subsequent ACK or NACK.

In view of the above, the present disclosure provides a definition of a minimum duration applicable to the slot aggregation scenario and proposes an HARQ feedback process that makes the interpretation of downlink feedback information unambiguous.

Embodiments of the present disclosure are described below with reference to the exemplary scenario of FIG. 4.

Figures 4, 5:
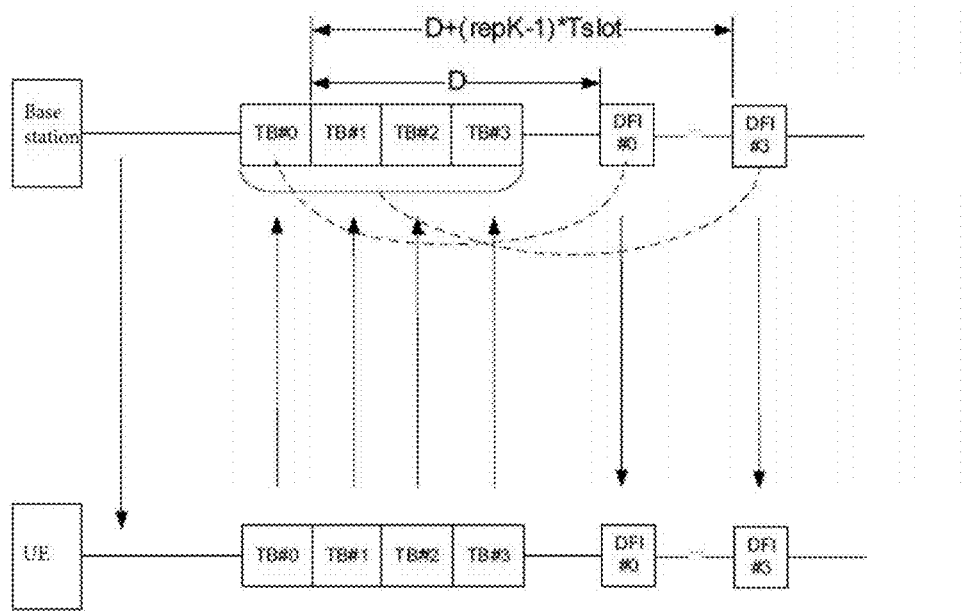
FIG. 4 illustrates an example of the uplink repetitive transmissions using the slot aggregation.
FIG. 5 illustrates a relationship between a reception start time and the validity of a HARQ feedback.

As shown in FIG. 4, the base station semi-statically configures PUSCH resource allocation for the UE in the manner of configured grant. For example, the base station may configure the ConfiguredGrantConfig parameter in the BWP information element for the UE. The ConfiguredGrantConfig may provide for example information about the resource allocation pre-configured to the UE, such as a time-domain allocation parameter timeDomainAllocation (which indicates a combination of PUSCH mapping type, starting symbol and length) and a frequency-domain allocation parameter, frequencedomainallocation; it may also provide information about the modulation order, the target code rate and the transport block size, such as the parameter mcsAndTBS, or the like.

Further, the ConfiguredGrantConfig may also schedule repetitive transmissions over consecutive slots by configuring a parameter repK to a value greater than 1 (e.g., 2, 4, 8, etc.), the value of repK indicating the number of repetitions. When the repetitive transmissions are enabled, repK-RV may also be provided in the ConfiguredGrantConfig, which indicates a Redundancy Version (RV) sequence to be used.

In the non-limiting example shown in FIG. 4, it is assumed that repK is set to 4, i.e. the UE may repetitively transmit the same user data 4 times over the allocated consecutive slots.

Here, the user data repetitively transmitted by the PUSCH corresponds to one Transport Block (TB). That is, the UE may repetitively transmit the TB containing the same user data 4 times, such as TB #0, TB #1, TB #2, TB #3 shown in FIG. 4. Depending on the preconfigured parameter repK-RV, a redundancy version may be applied to the respective TB in accordance with a redundancy version sequence corresponding to the repK-RV. For example, for the nth transmission occasion (i.e., the transmission on the nth slot) in repK=4 repetitions, the redundancy version to be applied to the TB corresponds to the (mod (n−1,4)+1) value in the configured sequence of redundancy versions. Thus, the transport blocks TB #0, TB #1, TB #2 and TB #3 to be transmitted in corresponding repetitions comprise the same user data and the respective redundancy versions, respectively.

In the scenario of configured grant, the time-frequency resources usable by the UE for PUSCH transmission occur periodically, and the UE may transmit these transport blocks at the latest available transmission occasions. For example, the first transport block TB #0 will be transmitted in the first slot scheduled by the configured grant after undergoing Cyclic Redundancy Check (CRC) addition to the transport block, the code block segmentation and the code block CRC addition, the channel coding, the physical layer HARQ processing, the rate matching, the scrambling, the modulation, the layer mapping, the transform precoding and the precoding, and the mapping to allocated resources and antenna ports as described above.

The 5G NR supports HARQ with asynchronous incremental redundancy so as to ensure the reliability of the downlink and uplink data transmissions. HARQ uses a stop-and-wait protocol to transmit data. Specifically, after transmitting a TB, the transmitter stops to wait for the acknowledgement information. The receiver makes either a positive (ACK) or negative (NACK) acknowledgement for the TB with 1 bit. However, since the transmitter stops to wait for the acknowledgement after each transmission, the throughput will be low. Therefore, the transmitter can use multiple parallel HARQ processes: while one HARQ process is waiting for acknowledgement information, the transmitter may continue to transmit data using another HARQ process. These HARQ processes together constitute a HARQ entity that incorporates a stop-and-wait protocol while allowing continuous transmissions of data.

Each HARQ process processes only one TB in one Transmission Time Interval (TTI). On the receiving side, each HARQ process needs to have an independent HARQ buffer to perform soft combining on the received data. In the example shown in FIG. 4, the transport blocks TB #0, TB #1, TB #2, TB #3 to be transmitted are processed by the same HARQ process and thus have the same HARQ process number (i.e., HARQ process ID). The HARQ process sends the first transport block TB #0 on the PUSCH in the first slot, the second transport block TB #1 on the PUSCH in the second slot, and so on.

The base station, which is the receiver, sequentially receives signals carrying TB #0, TB #1, TB #2, TB #3 and stores the signals in the HARQ buffer after the signal processing such as demodulation, descrambling and the like. The base station may perform a decoding process using the received signal.

The decoding by the base station may be started immediately after the signal carrying TB #0 is received. The result of the decoding depends on the quality of the signal. For example, when the channel condition is good, the base station may be able to successfully decode the user data carried in the signal, but when the interference is severe, the base station may not be able to successfully decode the user data carried in the signal. If the decoding using the signal for TB #0 fails, the base station may combine the signal for TB #0 stored in the HARQ buffer and the signal for TB #1 subsequently received, and perform a joint decoding using the combined signals, which may improve a success rate of the decoding. However, if the user data cannot be decoded using the signals for TB #0 and TB #1, the base station may combine the signals for TB #0, TB #1, which are stored in the HARQ buffer, and a signal for TB #2 which is subsequently received, and perform the joint decoding using the three, and so on.

The base station may feed back to the UE an ACK indicating successful decoding or a NACK indicating unsuccessful decoding. Depending on the specific feedback settings at the base station, the base station may send a HARQ feedback after the decoding of the received signal in each slot is completed, or may send a HARQ feedback after the final decoding result comes out.

However, since the decoding process and feedback mechanism at the base station are agnostic to the UE, the earliest case to be considered is that the base station may send an ACK or NACK to the UE upon decoding the signal of TB #0.

According to an embodiment of the present disclosure, for the case of slot aggregation, a minimum duration D before receiving the HARQ feedback is defined as a time period from the completion of transmission/reception of a transport block in the first slot (i.e., the completion of transmission/reception of the ending symbol of the transport block) to the start of reception/transmission of a DFI carrying a related HARQ feedback (i.e., the start of reception/transmission of the starting symbol of the DFI). That is, for example, in the example shown in FIG. 4, the UE may expect to receive the HARQ feedback at the earliest after the pre-configured minimum duration D has elapsed from the transmission completion timing of the ending symbol of the first transport block TB #0, instead of receiving the HARQ feedback after the pre-configured minimum duration D has elapsed from the transmission completion timing of the ending symbol of the last transport block TB #3. Accordingly, the base station may transmit the HARQ feedback at the earliest after the pre-configured minimum duration D has elapsed from the reception completion timing of the ending symbol of the first transport block TB #0, instead of transmitting the HARQ feedback after the pre-configured minimum duration D has elapsed from the reception completion timing of the ending symbol of the last transport block TB #3. It is assumed here that the transmission at the UE and the reception at the base station, or the reception at the UE and the transmission at the base station, are synchronized because the propagation time of electromagnetic wave between the UE and the base station is short enough to be negligible.

Therefore, according to the embodiments of the present disclosure, in the scenario of slot aggregation, the minimum duration D before transmitting or receiving the HARQ feedback is defined with reference to the first transmission of the repetitive transmissions, rather than with reference to the entirety of the repetitive transmissions. It should be appreciated that the unit of the defined minimum duration D may be the number of slots, the number of symbols, or an absolute time (e.g., ms), since these metrics are scalable to each other given the subcarrier spacing (SCS). Likewise, the slot duration "$T_{slot}$" mentioned below may have the same metering as the minimum duration D, such as the number of slots, the number of symbols, or an absolute time. For example, $T_{slot}$ may represent 1 slot when the minimum duration D represents the number of slots; $T_{slot}$ may be the number of symbols (e.g., 12 or 14 symbols) in 1 slot when the minimum duration D represents the number of symbols; and $T_{slot}$ may represent a duration of 1 slot, when the minimum duration D represents an absolute time, and so on.

For Time Division Duplex (TDD) communication, the UE can perform the receiving action only after the scheduled repetitive transmission action is completed, and therefore, preferably, the minimum duration D is configured to be not shorter than the duration of the subsequent repetitive transmission(s), e.g., in the example of FIG. 4, the minimum duration D is not shorter than the length of 3 slots, so that the communication module of the UE can perform the reception after the transmissions of TB #1, TB #2 and TB #3 are completed.

By defining the minimum duration D as described above, the UE can receive the HARQ feedback without omission even if the base station sends a HARQ feedback for each transport block, without having to monitor the channel all the time.

Further, according to embodiments of the present disclosure, the UE may determine the validity of the feedback according to the timing at which the HARQ feedback (especially NACK) is received.

The HARQ feedback implemented by the base station and the UE is discussed below for specific decoding cases, wherein for ease of understanding, it is assumed that the signal transmission or reception completion timing of TB #0 is $t_{end}$:

1) With respect to the decoding on the signal for TB #0, the base station may transmit downlink feedback information (DFI #0) including a HARQ feedback associated with the decoding of the signal of TB #0 at a timing after $t_{end}$+D.

This feedback may be an ACK indicating that the decoding is successful, so the UE will know that the base station has obtained the transmitted data, thereby determining that the ACK is valid, and terminate the HARQ process associated with the repetitive transmissions.

This feedback may alternatively be a NACK indicating that the decoding is unsuccessful, and the UE determines whether the timing at which the NACK is received is before $t_{end}+D+(repK-1)T_{slot}$, and if so, determines that the NACK is invalid because the NACK received at this timing is not the final decoding result.

2) If the decoding of the signal for TB #0 fails, the base station can perform the joint decoding using the signal for TB #0 and the subsequently received signal for TB #1. With respect to the joint decoding on the signals for TB #0 and TB #1, the base station may transmit DFI #1 including a HARQ feedback associated with this joint decoding to the UE at a timing after $t_{end}+D+T_{slot}$. This feedback may be an ACK indicating that the decoding is successful, and the UE will know that the decoding at the base station is successful, and terminates the HARQ process associated with the repetitive transmissions.

This feedback may alternatively be a NACK indicating that the decoding is unsuccessful, and the UE determines whether the timing at which the NACK is received is before $t_{end}+D+(repK-1)T_{slot}$, and if so, determines that the NACK is invalid because the NACK received at this timing is not the final decoding result.

3) If the joint decoding on the signals for TB #0 and TB #1 fails, the base station can perform the joint decoding using the signals for TB #0 and TB #1 and the subsequently received signal for TB #2. With respect to the joint decoding on the signals for TB #0, TB #1 and TB #2, the base station may transmit DFI #2 including a HARQ feedback associated with the joint decoding to the UE at a timing after $t_{end}+D+2*T_{slot}$. This feedback may be an ACK indicating that the decoding is successful, the UE will know that the decoding at the base station is successful, and terminate the HARQ process associated with the repetitive transmissions.

This feedback may alternatively be a NACK indicating that the decoding is unsuccessful, and the UE determines whether the timing at which the NACK is received is before $t_{end}+D+(repK-1)T_{slot}$, and if so, determines that the NACK is invalid because the NACK received at this timing is not the final decoding result.

4) If the joint decoding on the signals for TB #0, TB #1 and TB #2 fails, the base station can perform the joint decoding using the signals for TB #0, TB #1, and TB #2 and the subsequently received signal for TB #3. For the joint decoding on the signals for TB #0, TB #1, TB #2 and TB #3, the base station may transmit DFI #3 including a HARQ feedback associated with the joint decoding to the UE at a timing after $t_{end}+D+3*T_{slot}$. This feedback may be an ACK indicating that the decoding is successful, the UE will know that the decoding at the base station is successful, and terminates the HARQ process associated with the repetitive transmissions.

This feedback may alternatively be a NACK indicating that the decoding is unsuccessful, and the UE determines that the timing at which the NACK is received is after $t_{end}+D+(repK-1) T_{slot}$, and the UE will know that the decoding based on all of the repetitively transmitted signals fails and determines that the NACK is valid. The UE may retransmit TB #0~TB #3 on the next set of aggregated slots with the configured grant.

According to the embodiments of the present disclosure, the base station may preferably be restricted such that NACK is sent only once after $t_{end}+D+(repK-1)T_{slot}$, thereby avoiding sending too many invalid NACKs. Of course, the ACK may not be so restricted and may be transmitted at any time after $t_{end}+D$.

As described above, according to the embodiments of the present disclosure, a time point threshold $t_{end}+D+(repK-1)T_{slot}$ is designed, so that the UE can decide the validity of the HARQ feedback by comparing the timing at which the HARQ feedback is received with this time point threshold. Accordingly, the base station may also pose validity to the HARQ feedback by controlling the transmission timing. FIG. 5 shows the relationship between the reception start time and the validity of the HARQ feedback.

Preferably, the aggregated slots scheduled for the repetitive transmissions should be within a Channel Occupancy Time (COT) for the UE. However, the inventors of the present disclosure consider that there may be cases where a portion of the scheduled aggregated slots are outside the UE's COT. This means that the UE cannot complete the configured repK repetitive transmissions within a single COT.

As a solution, the UE may give up the repetitive transmissions that are not within the current COT, i.e. the number of the repetitive transmissions that the UE actually completes, $repK_{actual}$, is smaller than the configured number of retransmissions. At this time, the time point threshold $t_{end}+D+(repK-1)T_{slot}$ defined above should be changed to $t_{end}+D+(repK_{actual}-1)T_{slot}$.

As another solution, the communication system may be required to support the repetitive transmissions across COTs, i.e. the repetitive transmissions that are not completed in the current COT may be completed in the next COT. At this time, the time point threshold $t_{end}+D+(repK-1)T_{slot}$ defined above should be changed to $t_{end}+D+(repK-1)T_{slot}+T_{cot}$, where $T_{cot}$ is a duration between two COTs. Since $T_{cot}$ is typically long, this can result in a significant increase in the latency of HARQ feedback.

As yet another solution, the UE may modify repK and inform the gNB of the modified repK through Uplink Control Information (UCI). At this time, repK in the time point threshold $T_{cot}$ defined above is the modified number of repetitive transmissions. This solution may lead to an increased signaling burden.

An electronic device and a communication method to which the embodiments of the present disclosure can be applied are described next.

Figure 6A:
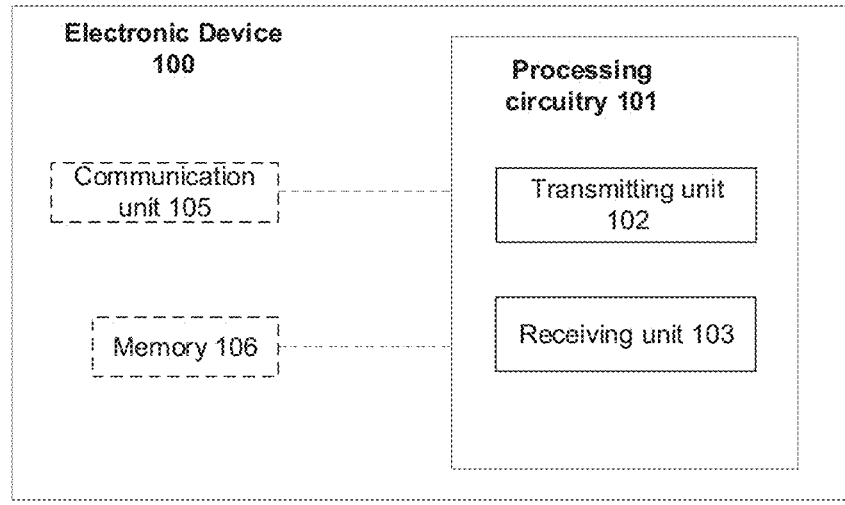
FIG. 6A illustrates a block diagram of an electronic device on the user device side according to the present disclosure.

FIG. 6A is a block diagram illustrating an electronic device 100 according to the present disclosure. The electronic device 100 may be a UE or a component of a UE.

As shown in FIG. 6A, the electronic device 100 includes a processing circuitry 101. The processing circuitry 101 comprises at least a transmitting unit 102 and a receiving unit 103. The processing circuitry 101 may be configured to perform the communication method illustrated in FIG. 6B. The processing circuitry 101 may refer to various implementations of digital circuitry, analog circuitry, or mixed-signal (a combination of analog and digital) circuitry that perform functions in a UE.

Figure 6B:
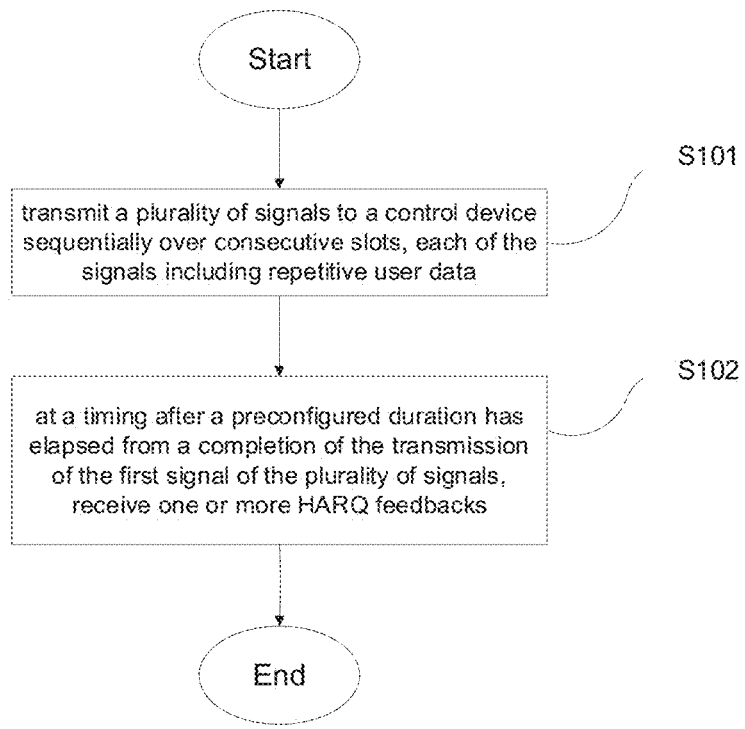
FIG. 6B illustrates a communication method on the user device side according to the present disclosure.

The transmitting unit 102 of the processing circuitry 101 is configured to sequentially transmit a plurality of signals to a control device such as the gNB over consecutive time slots, i.e. to perform Step S101 in FIG. 6B. The transmitted signals contain repetitive user data. Each of the signals may include a different redundancy version of the user data in addition to the user data. The transmission of the plurality of signals may correspond to the same HARQ process.

The receiving unit 103 is configured to receive one or more HARQ feedbacks from the control device at a timing after a pre-configured duration has elapsed from the transmission completion timing of the first one of the plurality of signals, i.e. to perform Step S202 in FIG. 6B. The one or more HARQ feedbacks indicate whether the decoding by the control device on the user data is successful or not. The one or more HARQ feedbacks have the same HARQ process number. The preconfigured duration is equal to or longer than a time period from the completion of transmission of the first signal to the completion of transmission of the last signal.

The processing circuitry 101 may be further configured to determine the validity of the HARQ feedback based on the reception start timing of the HARQ feedback. In particular, a NACK received before $(D+(repK-1)*T_{slot})$ has elapsed from the transmission completion timing of the first signal is determined to be invalid, where D is the preconfigured duration, repK is the number of the plurality of signals received, and $T_{slot}$ is the length of each slot.

The electronic device 100 may also include a communication unit 105. The communication unit 105 may be configured to communicate with a base station under control of the processing circuitry 101. In one example, the communication unit 105 may be implemented as a transceiver, including an antenna array and/or a radio frequency link, among other communication components. The communication unit 105 is depicted with a dashed line because it may also be located outside the electronic device 100.

The electronic device 100 may also include a memory 106. The memory 106 may store various data and instructions, such as programs and data for operation of the electronic device 100, various data generated by the processing circuitry 101, various control signaling or traffic data sent or received by the communication unit 105, and so forth. The memory 106 is depicted with dashed lines because it may also be located within the processing circuitry 101 or external to the electronic device 100.

Figure 7A:
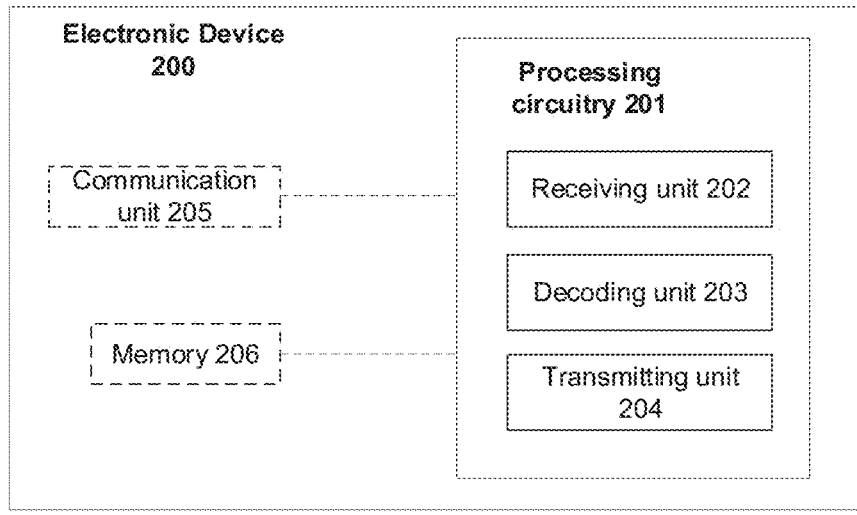
FIG. 7A illustrates a block diagram of an electronic device on the control device side according to the present disclosure.

FIG. 7A is a block diagram illustrating an electronic device 200 according to the present disclosure. The electronic device 200 may be a base station device or be located in a base station device.

As shown in FIG. 7A, the electronic device 200 includes a processing circuitry 201. The processing circuitry 201 includes at least a receiving unit 202, a decoding unit 203, and a transmitting unit 204. The processing circuitry 201 may be configured to perform the communication method shown in FIG. 7B. Processing circuitry 201 may refer to various implementations of digital circuitry analog circuitry, or mixed-signal (a combination of analog and digital) circuitry that perform functions in a base station device.

Figure 7B:
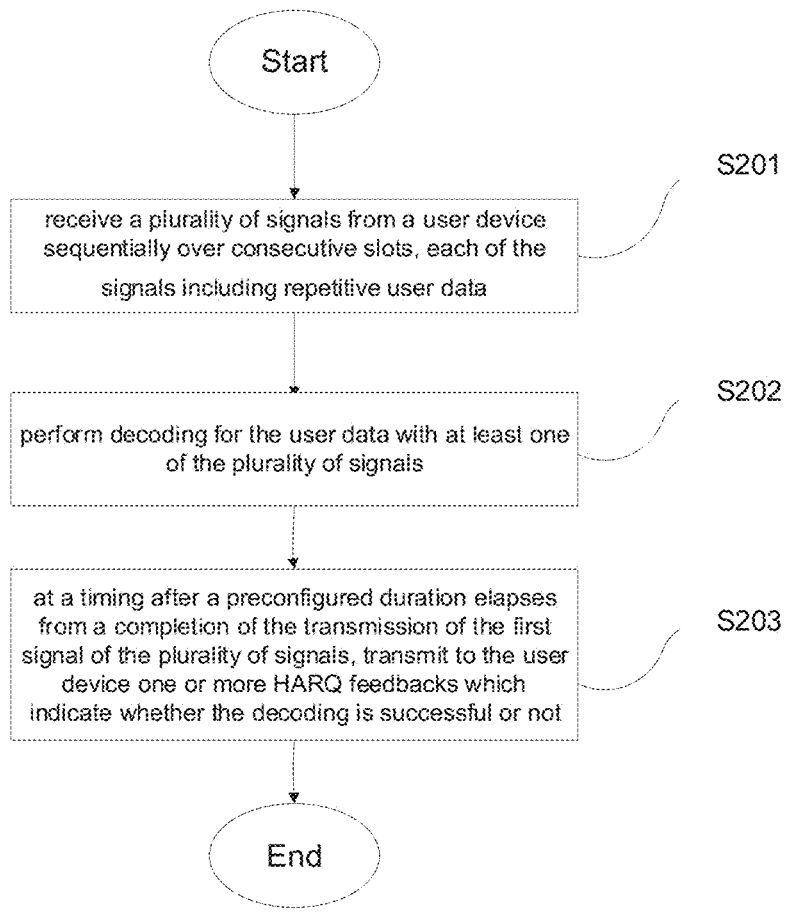
FIG. 7B illustrates a communication method on the control device side according to the present disclosure.

The receiving unit 202 may be configured to receive a plurality of signals from the user device sequentially over consecutive time slots, i.e., to perform Step S201 in FIG. 7B. Each of the signals contains repetitive user data. Each of the signal may include a different redundancy version of the user data in addition to the user data. The transmissions of the multiple signals may correspond to the same HARQ process. The receiving unit 202 may store the plurality of signals in a HARQ buffer associated with the HARQ process.

The decoding unit 203 may be configured to perform decoding for the user data using at least one of the plurality of signals, i.e. to perform Step S202 in FIG. 7B. The decoding unit 203 may perform the decoding by soft-combining the data stored in the HARQ buffer.

In response to a result of the decoding by the decoding unit 203, the transmitting unit 204 may be configured to transmit one or more HARQ feedbacks indicating whether the decoding is successful or not to the user device at a timing after a pre-configured duration has elapsed from the reception completion timing of the first one of the plurality of signals. In particular, the transmitting unit 204 may be configured not to transmit a NACK until $(D+(repK-1)*T_{slot})$ has elapsed from the reception completion timing of the first signal. If the decoding unit 203 successfully decodes the user data, the transmitting unit 204 may transmit an ACK at any timing after a pre-configured duration has elapsed from the reception completion timing of the first signal.

The electronic device 200 may further include a communication unit 205. The communication unit 205 may be configured to communicate with a UE under control of the processing circuitry 201. In one example, the communication unit 205 may be implemented as a transmitter or transceiver, including antenna arrays and/or radio frequency links, among other communication components. The communication unit 205 is depicted with a dashed line because it may also be located outside the electronic device 200.

The electronic device 200 may also include memory 206. The memory 206 may store various data and instructions, programs and data for the operation of the electronic device 200, various data generated by the processing circuit 201, data to be transmitted by the communication unit 205, and the like. The memory 206 is depicted with dashed lines because it may also be located within the processing circuit 201 or external to the electronic device 200.

Various aspects of the embodiments of the present disclosure have been described in detail above, but it should be noted that the structure, arrangement, type, number, etc. of the antenna array as shown, the ports, the reference signals, the communication devices, the communication methods, and like as described above are not intended to limit aspects of the present disclosure to these particular examples.

It should be understood that the units of the electronic devices 100 and 200 described in the above embodiments are only logical modules divided according to the specific functions implemented by the units, and are not used to limit the specific implementation manner. In actual implementation, the above units may be implemented as independent physical entities, or may also be implemented by a single entity (for example, a processor (CPU or DSP, etc.), an integrated circuit, etc.).

It should be understood that the processing circuitries 101 and 201 described in the embodiments above may include, for example, circuitry such as an Integrated Circuit (IC), an Application Specific Integrated Circuit (ASIC), portions or circuits of an individual processor core, an entire processor core, an individual processor, a programmable hardware device such as a Field Programmable Gate Array (FPGA), and/or a system including multiple processors. The memories 106 and 206 may be volatile and/or non-volatile memories. For example, memories 106 and 206 may include, but are not limited to, Random Access Memory (RAM), Dynamic Random Access Memory (DRAM), Static Random Access Memory (SRAM), Read Only Memory (ROM), flash memory.

It should be understood that the units of the electronic devices 100 and 200 described in the above embodiments are only logical modules divided according to the specific functions implemented by the units, and are not used to limit the specific implementation manner. In actual implementation, the above units may be implemented as independent physical entities, or may also be implemented by a single entity (for example, a processor (CPU or DSP, etc.), an integrated circuit, etc.).

Exemplary Implementations of the Present Disclosure

According to the embodiments of the present disclosure, various implementations for practicing concepts of the present disclosure can be conceived, including but not limited to:

1). An electronic device on side of a user device, comprising a processing circuitry configured to: transmit a plurality of signals to a control device sequentially over consecutive slots, each of the signals including repetitive user data; and at a timing after a preconfigured duration has elapsed from a completion of the transmission of the first signal of the plurality of signals, receive one or more hybrid automatic repeat request (HARQ) feedbacks which indicate whether a decoding for the user data by the control device is successful or not.

2). The electronic device of 1), wherein the processing circuitry is further configured to: if a HARQ feedback indicating unsuccessful decoding is received at a timing before $(D+(repK-1)*T_{slot})$ has elapsed from the completion of transmission of the first signal, determine that this HARQ feedback is invalid, wherein D is the preconfigured duration, repK is a number of the transmitted plurality of signals, and $T_{slot}$ is a duration of each slot.

3). The electronic device of 1), wherein the processing circuitry is further configured to: if a HARQ feedback indicating unsuccessful decoding is received at a timing after $(D+(repK-1)*T_{slot})$ has elapsed from the completion of the transmission of the first signal, determine that this HARQ feedback is valid, and retransmit the plurality of signals.

4). The electronic device of 1), wherein the processing circuitry is further configured to: if a HARQ feedback indicating successful decoding is received at the timing, determine that the HARQ feedback is valid.

5). The electronic device of 1), wherein the processing circuitry is further configured to transmit the plurality of signals within a single Channel Occupancy Time (COT).

6). The electronic device of 1), wherein each of the plurality of signals includes a respective redundancy version in addition to the user data.

7). The electronic device of 2), wherein the preconfigured duration is equal to or longer than $(repK-1)*T_{slot}$.

8). The electronic device of 1), wherein the one or more HARQ feedbacks have the same HARQ process number.

9. An electronic device on side of a control device, comprising a processing circuitry configured to: receive a plurality of signals from a user device sequentially over consecutive slots, each of the signals including repetitive user data; perform decoding for the user data with at least one of the plurality of signals; and at a timing after a preconfigured duration has elapsed from a completion of the transmission of the first signal of the plurality of signals, transmit to the user device one or more hybrid automatic repeat request (HARQ) feedbacks which indicate whether the decoding is successful or not.

10). The electronic device of 9), wherein the processing circuitry is further configured to: in response to the user data being decoded with the at least one of the plurality of signals, transmit a HARQ feedback indicating successful decoding to the user device at the timing.

11). The electronic device of 9), wherein the processing circuitry is further configured to: not send a HARQ feedback indicating unsuccessful decoding until $(D+(repK-1)*T_{slot})$ has elapsed from a completion of the reception of the first signal, where D is the preconfigured duration, repK is a number of the plurality of signals as received, and $T_{slot}$ is a duration of each slot.

12). The electronic device of 9), wherein the processing circuitry is further configured to: decode the user data by combining a currently received signal and previously received signals of the plurality of signals.

13). The electronic device of 10), wherein the plurality of signals are transmitted by a user device within a single Channel Occupancy Time (COT).

14). The electronic device of claim 9, wherein each of the plurality of signals includes a respective redundancy version in addition to the user data.

15). The electronic device of claim 9, wherein the preconfigured duration is equal to or longer than $(repK-1)*T_{slot}$.

16). A communication method, comprising: transmitting a plurality of signals to a control device sequentially over consecutive slots, each of the signals including repetitive user data; and at a timing after a preconfigured duration has elapsed from a completion of the transmission of the first signal of the plurality of signals, receiving one or more hybrid automatic repeat request (HARQ) feedbacks which indicate whether a decoding for the user data by the control device is successful or not.

17). A communication method, comprising: receiving a plurality of signals from a user device sequentially over consecutive slots, each of the signals including repetitive user data; performing decoding for the user data with at least one of the plurality of signals; and at a timing after a preconfigured duration has elapsed from a completion of the transmission of the first signal of the plurality of signals, transmitting to the user device one or more hybrid automatic repeat request (HARQ) feedbacks which indicate whether the decoding is successful or not.

18). A non-transitory computer readable storage medium storing executable instructions which, when executed, perform the communication method according to 16) or 17).

Application Examples of the Present Disclosure

The technology of the present disclosure can be applied to various products.

For example, the electronic device 200 according to the embodiments of the present disclosure can be implemented as a variety of base stations or installed in a variety of base stations, and the electronic device 100 according to the embodiments of the present disclosure can be implemented as a variety of user device or installed in a variety of user device.

The communication method according to the embodiments of the present disclosure may be implemented by various base stations or user device; the methods and operations according to the embodiments of the present disclosure may be embodied as computer-executable instructions, stored in a non-transitory computer-readable storage medium, and can be performed by various base stations or user device to implement one or more of the above-mentioned functions.

The technology according to the embodiments of the present disclosure can be made into various computer program products, which can be used in various base stations or user device to implement one or more of the above-mentioned functions.

The term "base station" used in the present disclosure has the full breadth of its usual meaning, and includes at least a wireless communication station used as a part of a wireless communication system or a radio system to facilitate communication. The base stations mentioned in the present disclosure can be implemented as any type of base station, preferably, such as the macro gNB or ng-eNB defined in the 3GPP 5G NR standard. A gNB may be a gNB that covers a cell smaller than a macro cell, such as a pico gNB, a micro gNB, and a home (femto) gNB. Instead, the base station may be implemented as any other type of base station such as a NodeB, an eNodeB and a base transceiver station (BTS). The base station may include a main body configured to control wireless communication, and one or more remote radio heads (RRH) disposed in a different place from the main body, a wireless relay, a drone control tower, a control unit in an automated plant or the like.

The user device may be implemented as a mobile terminal such as a smartphone, a tablet personal computer (PC), a notebook PC, a portable game terminal, a portable/dongle type mobile router, and a digital camera apparatus, or an in-vehicle terminal such as a car navigation device. The terminal device may also be implemented as a terminal (also called a machine type communication (MTC) terminal) that performs machine-to-machine (M2M) communication, a drone, a sensor or actuator in an automated plant or the like. Furthermore, the terminal device may be a wireless communication module (such as an integrated circuit module including a single die) mounted on each of the above terminals.

First Application Example of Base Station

Figure 8:
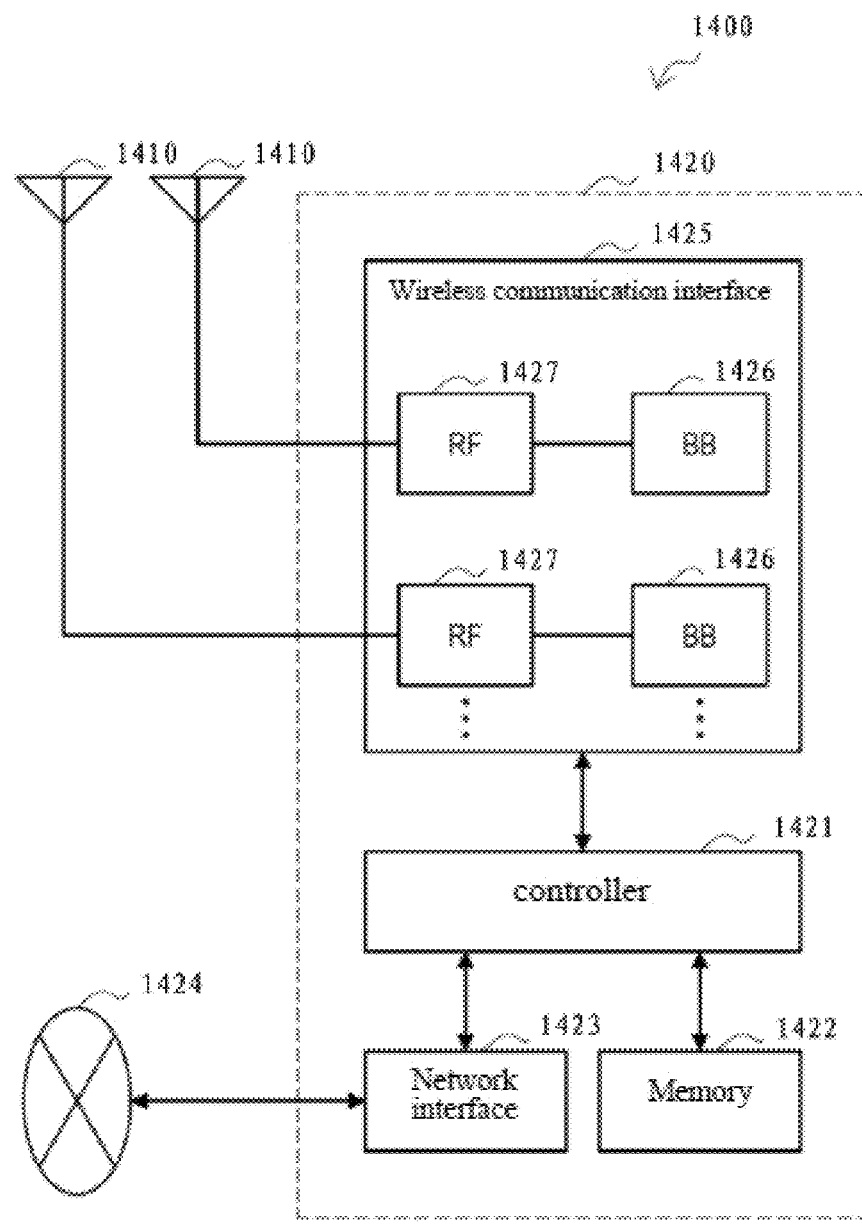
FIG. 8 illustrates a first example of schematic configuration of the base station according to the present disclosure.

FIG. 8 is a block diagram showing a first example of a schematic configuration of a base station to which the technology of the present disclosure can be applied. In FIG. 8, the base station is implemented as gNB 1400. The gNB 1400 includes a plurality of antennas 1410 and a base station device 1420. The base station device 1420 and each antenna 1410 may be connected to each other via an RF cable. In an implementation, the gNB 1400 (or the base station device 1420) herein may correspond to the above-mentioned electronic device 200.

The antennas 1410 includes multiple antenna elements. The antennas 1410, for example, can be arranged into the antenna array matrix, and are used for the base station device 1420 to transmit and receive wireless signals. For example, the multiple antennas 1410 may be compatible with multiple frequency bands used by gNB 1400.

The base station device 1420 includes a controller 1421, a memory 1422, a network interface 1423, and a wireless communication interface 1425.

The controller 1421 may be, for example, a CPU or a DSP, and operates various functions of the base station device 1420 at a higher layer. For example, the controller 1421 may include the processing circuitry 201 as described above, perform the communication method described in FIG. 7B, or control various components of the electronic device 200. For example, the controller 1421 generates data packets based on data in signals processed by the wireless communication interface 1425, and passes the generated packets via the network interface 1423. The controller 1421 may bundle data from multiple baseband processors to generate bundled packets, and pass the generated bundled packets. The controller 1421 may have logical functions that perform controls such as radio resource control, radio bearer control, mobility management, admission control, and scheduling. The controls can be performed in conjunction with a nearby gNB or core network node. The memory 1422 includes a RAM and a ROM, and stores a program executed by the controller 1421 and various types of control data such as a terminal list, transmission power data, and scheduling data.

The network interface 1423 is a communication interface for connecting the base station device 1420 to the core network 1424 (for example, 5G core network). The controller 1421 may communicate with a core network node or another gNB via the network interface 1423. In this case, the gNB 1400 and the core network node or other gNBs may be connected to each other through a logical interface such as an Si interface and an X2 interface. The network interface 1423 may also be a wired communication interface or a wireless communication interface for a wireless backhaul line. If the network interface 1423 is a wireless communication interface, compared with the frequency band used by the wireless communication interface 1425, the network interface 1423 can use a higher frequency band for wireless communication.

The wireless communication interface 1425 supports any cellular communication scheme such as 5G NR, and provides a wireless connection to a terminal located in a cell of the gNB 1400 via an antenna 1410. The wireless communication interface 1425 may generally include, for example, a baseband (BB) processor 1426 and an RF circuit 1427. The BB processor 1426 may perform, for example, encoding/decoding, modulation/demodulation, and multiplexing/demultiplexing, and execute various types of signal processing in layers such as L1, Medium Access Control (MAC), Radio Link Control (RLC), and Packet Data Convergence Protocol (PDCP). As an alternative of the controller 1421, the BB processor 1426 may have a part or all of the above-mentioned logical functions. The BB processor 1426 may be a memory storing a communication control program, or a module including a processor and related circuits configured to execute the program. Updating the program can change the function of the BB processor 1426. The module may be a card or a blade inserted into a slot of the base station device 1420. Alternatively, the module may be a chip mounted on a card or a blade. Meanwhile, the RF circuit 1427 may include, for example, a mixer, a filter, and an amplifier, and transmits and receives a wireless signal via the antenna 1410. Although FIG. 8 illustrates an example in which one RF circuit 1427 is connected to one antenna 1410, the present disclosure is not limited to this illustration, but one RF circuit 1427 may be connected to multiple antennas 1410 at the same time.

As shown in FIG. 8, the wireless communication interface 1425 may include a plurality of BB processors 1426. For example, the plurality of BB processors 1426 may be compatible with multiple frequency bands used by gNB 1400. As shown in FIG. 8, the wireless communication interface 1425 may include a plurality of RF circuits 1427. For example, the plurality of RF circuits 1427 may be compatible with multiple antenna elements. Although FIG. 8 shows an example in which the wireless communication interface 1425 includes a plurality of BB processors 1426 and a plurality of RF circuits 1427, the wireless communication interface 1425 may also include a single BB processor 1426 or a single RF circuit 1427.

In the gNB 1400 illustrated in FIG. 8, one or more of the units included in the processing circuitry 201 described with reference to FIG. 7A may be implemented in the radio communication interface 1425. Alternatively, at least a part of these components may be implemented in the controller 1421. As an example, the gNB 1400 includes a part (for example, the BB processor 1426) or the entire of the radio communication interface 1425 and/or a module including the controller 1421, and the one or more components may be implemented in the module. In this case, the module may store a program (in other words, a program causing the processor to execute operations of the one or more components) causing the processor to function as the one or more components, and execute the program. As another example, a program causing the processor to function as the one or more components may be installed in the gNB 1400, and the radio communication interface 1425 (for example, the BB processor 1426) and/or the controller 1421 may execute the program. As described above, as a device including the one or more components, the gNB 1400, the base station device 1420 or the module may be provided. In addition, a readable medium in which the program is recorded may be provided.

Second Application Example of Base Station

Figure 9:
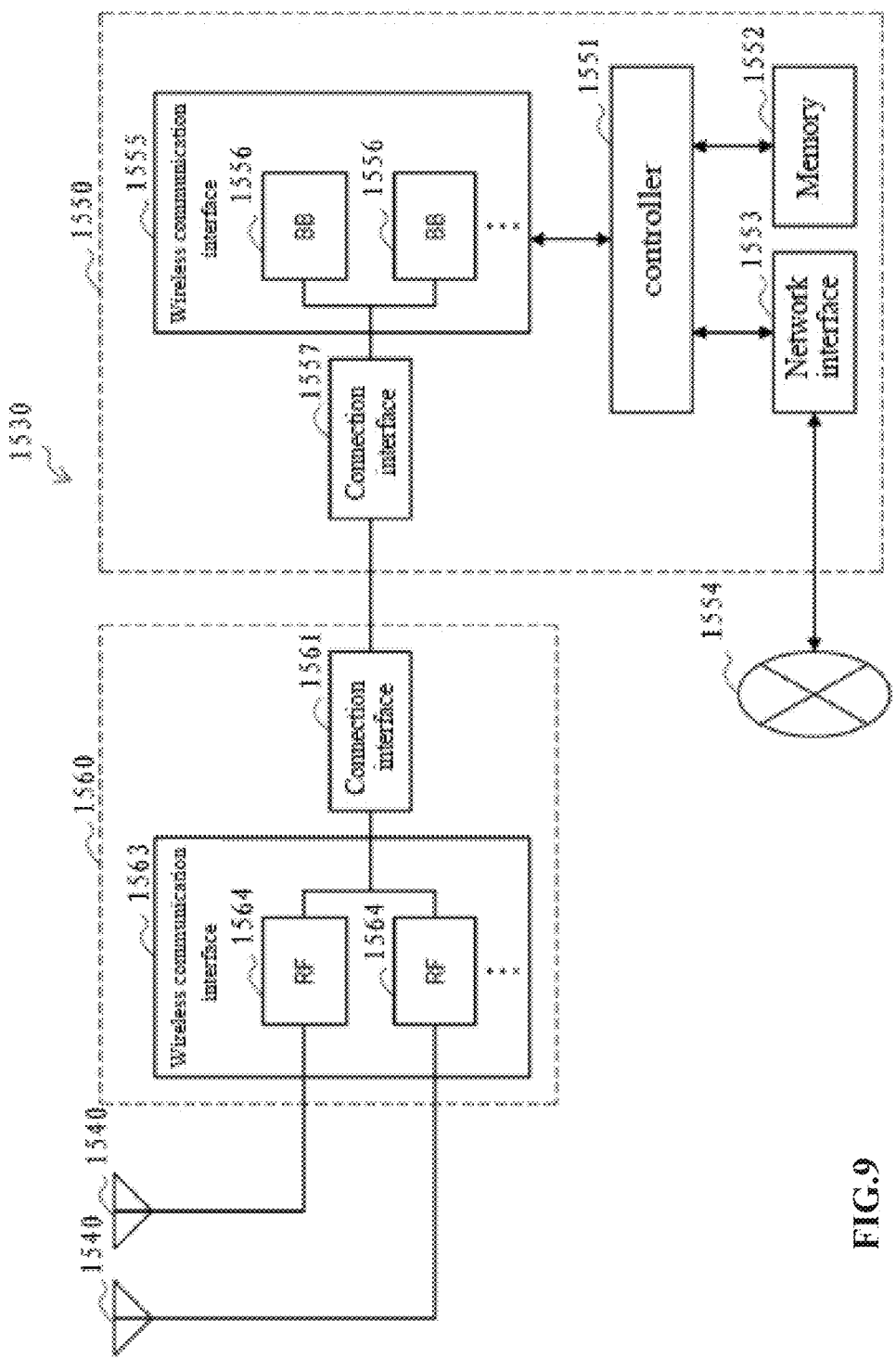
FIG. 9 illustrates a second example of schematic configuration of the base station according to the present disclosure.

FIG. 9 is a block diagram showing a second example of a schematic configuration of a base station to which the technology of the present disclosure can be applied. In FIG. 9, the base station is shown as gNB 1530. The gNB 1530 includes multiple antennas 1540, base station equipment 1550, and RRH 1560. The RRH 1560 and each antenna 1540 may be connected to each other via an RF cable. The base station equipment 1550 and the RRH 1560 may be connected to each other via a high-speed line such as a fiber optic cable. In an implementation manner, the gNB 1530 (or the base station device 1550) herein may correspond to the foregoing electronic devices 200.

The antennas 1540 include multiple antenna elements, such as multiple antenna arrays for large-scale MIMO. The antennas 1540, for example, can be arranged into the antenna array matrix, and are used for the base station device 1550 to transmit and receive wireless signals. For example, multiple antennas 1540 may be compatible with multiple frequency bands used by gNB 1530.

The base station device 1550 includes a controller 1551, a memory 1552, a network interface 1553, a wireless communication interface 1555, and a connection interface 1557. The controller 1551, the memory 1552, and the network interface 1553 are the same as the controller 1421, the memory 1422, and the network interface 1423 described with reference to FIG. 8.

The wireless communication interface 1555 supports any cellular communication scheme such as 5G NR, and provides wireless communication to a terminal located in a sector corresponding to the RRH 1560 via the RRH 1560 and the antenna 1540. The wireless communication interface 1555 may typically include, for example, a BB processor 1556. The BB processor 1556 is the same as the BB processor 1426 described with reference to FIG. 8 except that the BB processor 1556 is connected to the RF circuit 1564 of the RRH 1560 via the connection interface 1557. As shown in FIG. 9, the wireless communication interface 1555 may include a plurality of BB processors 1556. For example, multiple BB processors 1556 may be compatible with multiple frequency bands used by gNB 1530. Although FIG. 9 shows an example in which the wireless communication interface 1555 includes a plurality of BB processors 1556, the wireless communication interface 1555 may also include a single BB processor 1556.

The connection interface 1557 is an interface for connecting the base station device 1550 (wireless communication interface 1555) to the RRH 1560. The connection interface 1557 may also be a communication module for communication in the above-mentioned high-speed line connecting the base station device 1550 (wireless communication interface 1555) to the RRH 1560.

The RRH 1560 includes a connection interface 1561 and a wireless communication interface 1563.

The connection interface 1561 is an interface for connecting the RRH 1560 (wireless communication interface 1563) to the base station device 1550. The connection interface 1561 may also be a communication module for communication in the above-mentioned high-speed line.

The wireless communication interface 1563 transmits and receives wireless signals via the antenna 1540. The wireless communication interface 1563 may generally include, for example, an RF circuit 1564. The RF circuit 1564 may include, for example, a mixer, a filter, and an amplifier, and transmits and receives wireless signals via the antenna 1540. Although FIG. 9 illustrates an example in which one RF circuit 1564 is connected to one antenna 1540, the present disclosure is not limited to this illustration, but one RF circuit 1564 may be connected to multiple antennas 1540 at the same time.

As shown in FIG. 9, the wireless communication interface 1563 may include a plurality of RF circuits 1564. For example, the plurality of RF circuits 1564 may support multiple antenna elements. Although FIG. 9 shows an example in which the wireless communication interface 1563 includes a plurality of RF circuits 1564, the wireless communication interface 1563 may include a single RF circuit 1564.

In the gNB 1500 shown in FIG. 9, one or more of units included in the processing circuitry 201 described with reference to FIG. 7A may be implemented in the wireless communication interface 1525. Alternatively, at least a part of these components may be implemented in the controller 1521. For example, the gNB 1500 includes a part (for example, the BB processor 1526) or the whole of the wireless communication interface 1525, and/or a module including the controller 1521, and one or more components may be implemented in the module. In this case, the module may store a program for allowing the processor to function as one or more components (in other words, a program for allowing the processor to perform operations of one or more components), and may execute the program. As another example, a program for allowing the processor to function as one or more components may be installed in the gNB 1500, and the wireless communication interface 1525 (for example, the BB processor 1526) and/or the controller 1521 may execute the program. As described above, as a device including one or more components, the gNB 1500, the base station device 1520, or a module may be provided, and a program for allowing the processor to function as one or more components may be provided. In addition, a readable medium in which the program is recorded may be provided.

First Application Example of User Device

Figure 10:
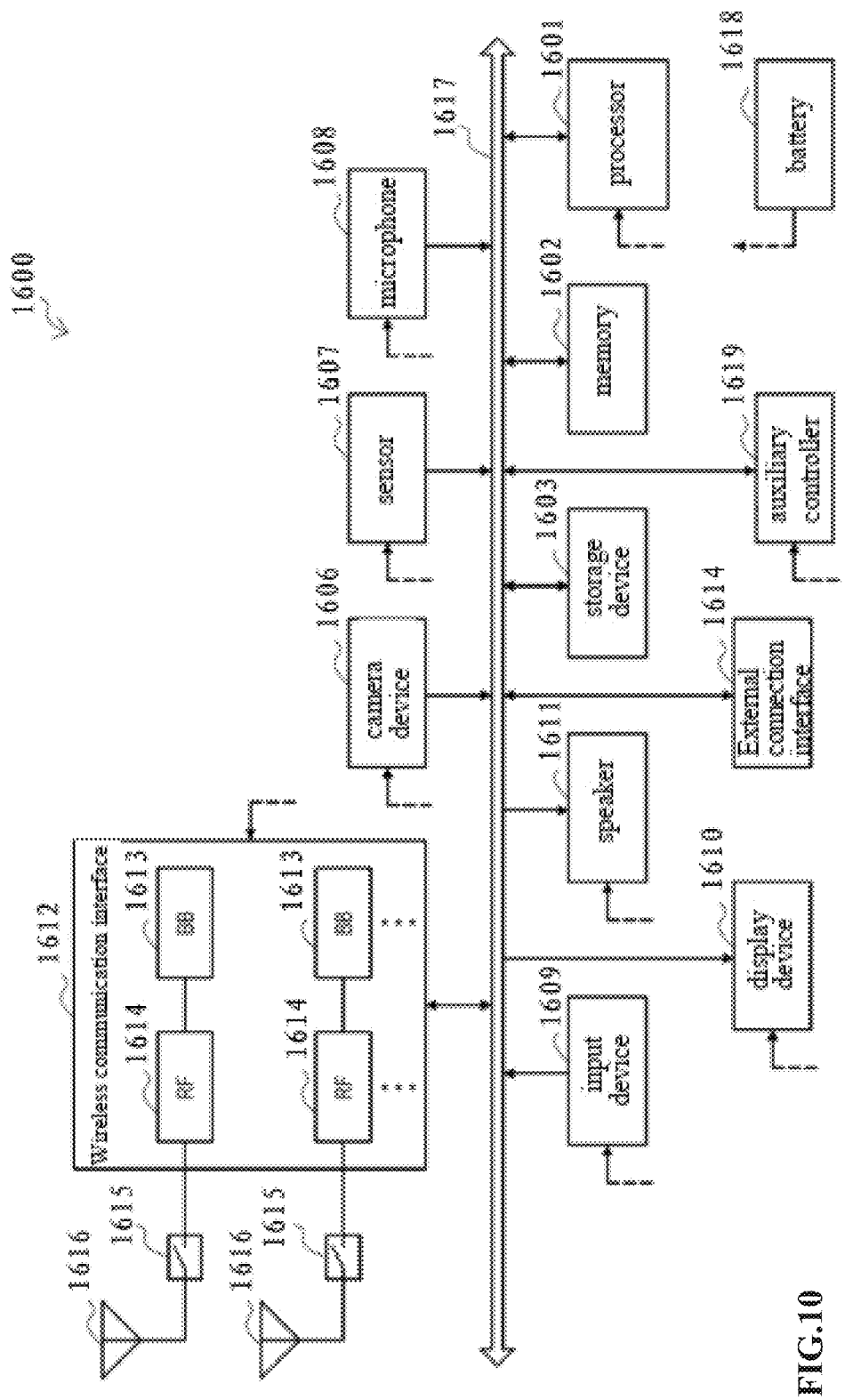
FIG. 10 illustrates an example of schematic configuration of a smart phone according to the present disclosure.

FIG. 10 is a block diagram showing an example of a schematic configuration of a smartphone 1600 to which the technology of the present disclosure can be applied. In an example, the smart phone 1600 may be implemented as the electronic device 100 described in the present disclosure.

The smartphone 1600 includes a processor 1601, a memory 1602, a storage device 1603, an external connection interface 1604, a camera device 1606, a sensor 1607, a microphone 1608, an input device 1609, a display device 1610, a speaker 1611, a wireless communication interface 1612, one or more antenna switches 1615, one or more antennas 1616, a bus 1617, a battery 1618, and an auxiliary controller 1619.

The processor 1601 may be, for example, a CPU or a system on chip (SoC), and controls functions of an application layer and another layer of the smartphone 1600. The processor 1601 may include or serve as the processing circuitry 101 described with reference to FIG. 6A. The memory 1602 includes a RAM and a ROM, and stores data and programs executed by the processor 1601 to perform the communication method as described with reference to FIG. 6B. The storage device 1603 may include a storage medium such as a semiconductor memory and a hard disk. The external connection interface 1604 is an interface for connecting external devices such as a memory card and a universal serial bus (USB) device to the smartphone 1600.

The camera device 1606 includes an image sensor such as a charge-coupled device (CCD) and a complementary metal oxide semiconductor (CMOS), and generates a captured image. The sensor 1607 may include a set of sensors such as a measurement sensor, a gyroscope sensor, a geomagnetic sensor, and an acceleration sensor. The microphone 1608 converts a sound input to the smartphone 1600 into an audio signal. The input device 1609 includes, for example, a touch sensor, a keypad, a keyboard, a button, or a switch configured to detect a touch on the screen of the display device 1610, and receives an operation or information input from a user. The display device 1610 includes a screen such as a liquid crystal display (LCD) and an organic light emitting diode (OLED) display, and displays an output image of the smartphone 1600. The speaker 1611 converts an audio signal output from the smartphone 1600 into a sound.

The wireless communication interface 1612 supports any cellular communication scheme such as 4G LTE, 5G NR or the like, and performs wireless communication. The wireless communication interface 1612 may generally include, for example, a BB processor 1613 and an RF circuit 1614. The BB processor 1613 may perform, for example, encoding/decoding, modulation/demodulation, and multiplexing/demultiplexing, and perform various types of signal processing for wireless communication. Meanwhile, the RF circuit 1614 may include, for example, a mixer, a filter, and an amplifier, and transmits and receives wireless signals via the antenna 1616. The wireless communication interface 1612 may be a chip module on which a BB processor 1613 and an RF circuit 1614 are integrated. As shown in FIG. 10, the wireless communication interface 1612 may include multiple BB processors 1613 and multiple RF circuits 1614. Although FIG. 10 illustrates an example in which the wireless communication interface 1612 includes a plurality of BB processors 1613 and a plurality of RF circuits 1614, the wireless communication interface 1612 may also include a single BB processor 1613 or a single RF circuit 1614.

In addition, in addition to the cellular communication scheme, the wireless communication interface 1612 may support other types of wireless communication scheme, such as a short-range wireless communication scheme, a near field communication scheme, and a wireless local area network (LAN) scheme. In this case, the wireless communication interface 1612 may include a BB processor 1613 and an RF circuit 1614 for each wireless communication scheme.

Each of the antenna switches 1615 switches a connection destination of the antenna 1616 between a plurality of circuits included in the wireless communication interface 1612 (for example, circuits for different wireless communication schemes).

The antennas 1616 includes multiple antenna elements. The antennas 1616, for example, can be arranged into the antenna array matrix, and are used for the wireless communication interface 1612 to transmit and receive wireless signals. The smart phone 1600 can includes one or more antenna panels (not shown).

In addition, the smartphone 1600 may include an antenna 1616 for each wireless communication scheme. In this case, the antenna switch 1615 may be omitted from the configuration of the smartphone 1600.

The bus 1617 connects the processor 1601, the memory 1602, the storage device 1603, the external connection interface 1604, the camera device 1606, the sensor 1607, the microphone 1608, the input device 1609, the display device 1610, the speaker 1611, the wireless communication interface 1612, and the auxiliary controller 1619 to each other. The battery 1618 supplies power to each block of the smartphone 1600 shown in FIG. 10 via a feeder, and the feeder is partially shown as a dotted line in the figure. The auxiliary controller 1619 operates the minimum necessary functions of the smartphone 1600 in the sleep mode, for example.

In the smart phone 1600 shown in FIG. 10, one or more of units included in the processing circuitry 101 described with reference to FIG. 6A may be implemented in the wireless communication interface 1612. Alternatively, at least a part of these components may be implemented in the processor 1601 or the auxiliary controller 1619. As an example, the smart phone 1600 includes a part (for example, the BB processor 1613) or the whole of the wireless communication interface 1612, and/or a module including the processor 1601 and/or the auxiliary controller 1619, and one or more components may be Implemented in this module. In this case, the module may store a program that allows processing to function as one or more components (in other words, a program for allowing the processor to perform operations of one or more components), and may execute the program. As another example, a program for allowing the processor to function as one or more components may be installed in the smart phone 1600, and the wireless communication interface 1612 (for example, the BB processor 1613), the processor 1601, and/or the auxiliary The controller 1619 can execute this program. As described above, as a device including one or more components, a smart phone 1600 or a module may be provided, and a program for allowing a processor to function as one or more components may be provided. In addition, a readable medium in which the program is recorded may be provided.

Second Application Example of User Device

Figure 11:
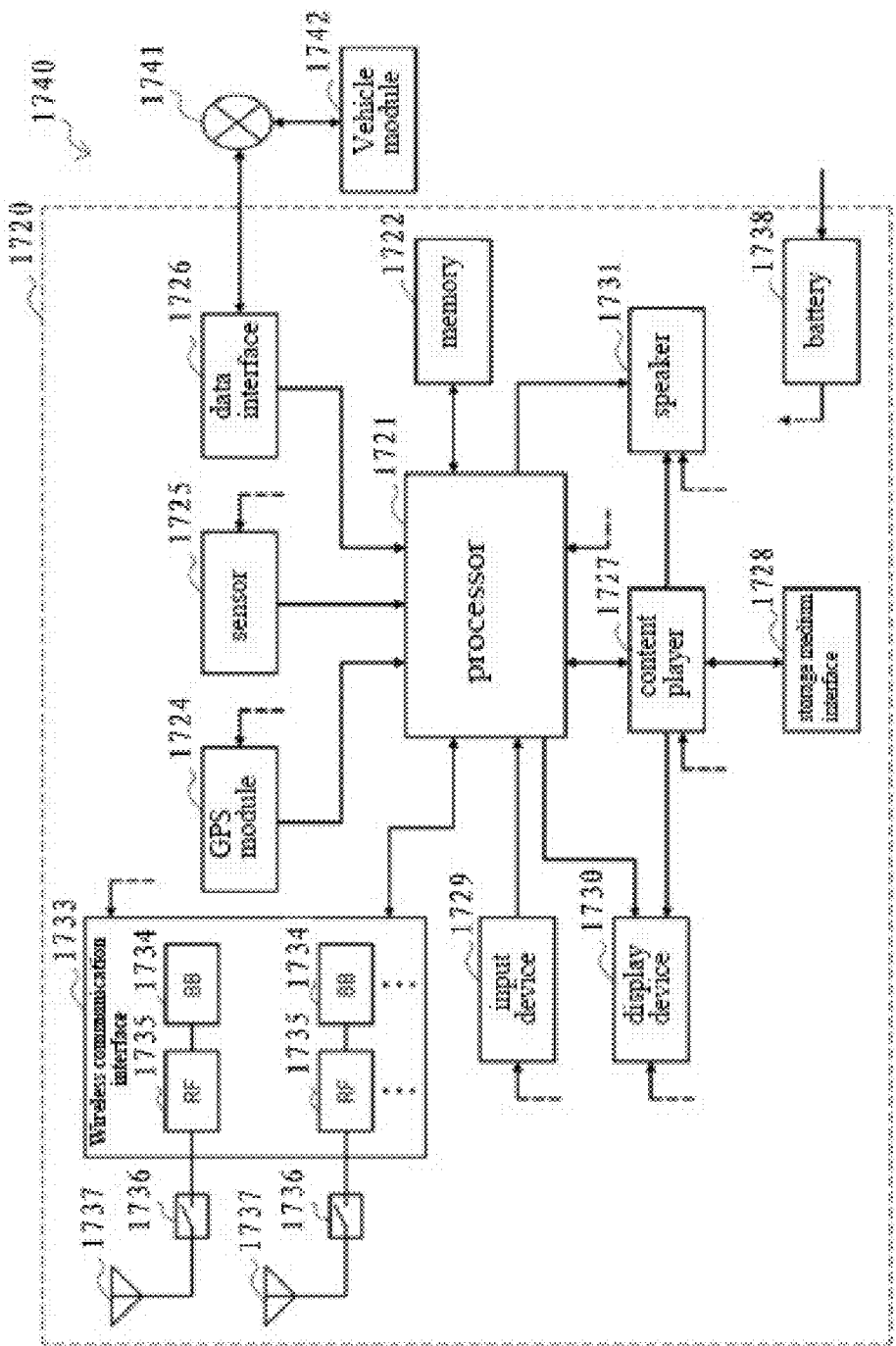
FIG. 11 illustrates an example of schematic configuration of an automobile navigation device according to the present disclosure.

FIG. 11 is a block diagram showing an example of a schematic configuration of a car navigation device 1720 to which the technology of the present disclosure can be applied. The car navigation device 1720 may be implemented as the electronic device 100 described with reference to FIG. 6A. The car navigation device 1720 includes a processor 1721, a memory 1722, a global positioning system (GPS) module 1724, a sensor 1725, a data interface 1726, a content player 1727, a storage medium interface 1728, an input device 1729, a display device 1730, a speaker 1731, and a wireless communication interface 1733, one or more antenna switches 1736, one or more antennas 1737, and a battery 1738. In one example, the car navigation device 1720 may be implemented as the UE as described in the present disclosure.

The processor 1721 may be, for example, a CPU or a SoC, and controls navigation functions and other functions of the car navigation device 1720. The memory 1722 includes a RAM and a ROM, and stores data and programs executed by the processor 1721.

The GPS module 1724 uses a GPS signal received from a GPS satellite to measure the position (such as latitude, longitude, and altitude) of the car navigation device 1720. The sensor 1725 may include a set of sensors such as a gyroscope sensor, a geomagnetic sensor, and an air pressure sensor. The data interface 1726 is connected to, for example, an in-vehicle network 1741 via a terminal not shown, and acquires data (such as vehicle speed data) generated by the vehicle.

The content player 1727 reproduces content stored in a storage medium such as a CD and a DVD, which is inserted into the storage medium interface 1728. The input device 1729 includes, for example, a touch sensor, a button, or a switch configured to detect a touch on the screen of the display device 1730, and receives an operation or information input from a user. The display device 1730 includes a screen such as an LCD or OLED display, and displays an image of a navigation function or reproduced content. The speaker 1731 outputs the sound of the navigation function or the reproduced content.

The wireless communication interface 1733 supports any cellular communication scheme such as 4G LTE or 5G NR, and performs wireless communication. The wireless communication interface 1733 may generally include, for example, a BB processor 1734 and an RF circuit 1735. The BB processor 1734 may perform, for example, encoding/decoding, modulation/demodulation, and multiplexing/demultiplexing, and perform various types of signal processing for wireless communication. Meanwhile, the RF circuit 1735 may include, for example, a mixer, a filter, and an amplifier, and transmit and receive wireless signals via the antenna 1737. The wireless communication interface 1733 may also be a chip module on which a BB processor 1734 and an RF circuit 1735 are integrated. As shown in FIG. 11, the wireless communication interface 1733 may include a plurality of BB processors 1734 and a plurality of RF circuits 1735. Although FIG. 11 shows an example in which the wireless communication interface 1733 includes a plurality of BB processors 1734 and a plurality of RF circuits 1735, the wireless communication interface 1733 may also include a single BB processor 1734 or a single RF circuit 1735.

In addition, in addition to the cellular communication scheme, the wireless communication interface 1733 may support other types of wireless communication scheme, such as a short-range wireless communication scheme, a near field communication scheme, and a wireless LAN scheme. In this case, the wireless communication interface 1733 may include a BB processor 1734 and an RF circuit 1735 for each wireless communication scheme.

Each of the antenna switches 1736 switches the connection destination of the antenna 1737 between a plurality of circuits included in the wireless communication interface 1733, such as circuits for different wireless communication schemes.

The antennas 1737 includes multiple antenna elements. The antennas 1737, for example, can be arranged into the antenna array matrix, and are used for the wireless communication interface 1733 to transmit and receive wireless signals.

In addition, the car navigation device 1720 may include an antenna 1737 for each wireless communication scheme. In this case, the antenna switch 1736 may be omitted from the configuration of the car navigation device 1720.

The battery 1738 supplies power to each block of the car navigation device 1720 shown in FIG. 11 via a feeder, and the feeder is partially shown as a dotted line in the figure. The battery 1738 accumulates power provided from the vehicle.

In the car navigation device 1720 shown in FIG. 11, one or more of units included in the processing circuitry 101 described with reference to FIG. 6A can be implemented in the wireless communication interface 1733. Alternatively, at least a part of these components may be implemented in the processor 1721. As an example, the car navigation device 1720 includes a part (for example, the BB processor 1734) or the whole of the wireless communication interface 1733, and/or a module including the processor 1721, and one or more components may be implemented in the module. In this case, the module may store a program that allows processing to function as one or more components (in other words, a program for allowing the processor to perform operations of one or more components), and may execute the program. As another example, a program for allowing the processor to function as one or more components may be installed in the car navigation device 1720, and the wireless communication interface 1733 (for example, the BB processor 1734) and/or the processor 1721 may Execute the procedure. As described above, as a device including one or more components, a car navigation device 1720 or a module may be provided, and a program for allowing the processor to function as one or more components may be provided. In addition, a readable medium in which the program is recorded may be provided.

The technology of the present disclosure may also be implemented as an in-vehicle system (or vehicle) 1740 including one or more of a car navigation device 1720, an in-vehicle network 1741, and a vehicle module 1742. The vehicle module 1742 generates vehicle data such as vehicle speed, engine speed, and failure information, and outputs the generated data to the in-vehicle network 1741.

Although the illustrative embodiments of the present disclosure have been described with reference to the accompanying drawings, the present disclosure is certainly not limited to the above examples. Those skilled in the art may achieve various adaptions and modifications within the scope of the appended claims, and it will be appreciated that these adaptions and modifications certainly fall into the scope of the technology of the present disclosure.

For example, in the above embodiments, the multiple functions included in one module may be implemented by separate means. Alternatively, in the above embodiments, the multiple functions included in multiple modules may be implemented by separate means, respectively. In additions, one of the above functions may be implemented by multiple modules. Needless to say, such configurations are included in the scope of the technology of the present disclosure.

In this specification, the steps described in the flowcharts include not only the processes performed sequentially in chronological order, but also the processes performed in parallel or separately but not necessarily performed in chronological order. Furthermore, even in the steps performed in chronological order, needless to say, the order may be changed appropriately.

Although the present disclosure and its advantages have been described in detail, it will be appreciated that various changes, replacements and transformations may be made without departing from the spirit and scope of the present disclosure as defined by the appended claims. In addition, the terms "include", "comprise" or any other variants of the embodiments of the present disclosure are intended to be non-exclusive inclusion, such that the process, method, article or device including a series of elements includes not only these elements, but also those that are not listed specifically, or those that are inherent to the process, method, article or device. In case of further limitations, the element defined by the sentence "include one" does not exclude the presence of additional same elements in the process, method, article or device including this element.

What is claimed is:

1. An electronic device, comprising:
    a processing circuitry configured to:
    receive Downlink Control Information (DCI) from a control device;
    in response to scheduling information in the DCI, perform a sequential transmission to transmit identical user data via a plurality of signals to the control device over a plurality of consecutive slots;
    sequentially receive plural pieces of hybrid automatic repeat request (HARQ) feedback information related to the sequentially transmitted plurality of signals, each of the plural pieces of the HARQ feedback information indicating whether a decoding of the user data of a corresponding one of the sequentially transmitted plurality of signals is successful or not, each of the plural pieces of HARQ feedback information sequentially received a preconfigured duration D after a corresponding one of the plurality of signals is transmitted;
    analyze each of the sequentially received plural pieces of HARQ feedback information in a sequence corresponding to a corresponding arrival time;
    in a case that any of the plural pieces of HARQ feedback information is ACK, determine a first arriving piece of HARQ feedback information that is ACK as valid HARQ feedback information and terminate the sequential transmission;
    in a case that any of the plural pieces of HARQ feedback information other than HARQ feedback information corresponding to a last transmitted signal of the plurality of signals is NACK, determine that the NACK is invalid HARQ feedback information and continue the sequential transmission; and
    only in a case that the HARQ feedback information corresponding to the last transmitted signal of the plurality of signals is NACK, determine that the NACK is valid HARQ feedback information and perform a sequential retransmission of the identical user data,
    wherein each of the plurality of signals includes a respective redundancy version in addition to the identical user data.

2. The electronic device of claim 1, wherein
    a timing after a completion of a last transmission of the sequential transmission is a timing after (D+(repK−1)*Tslot) has elapsed from a completion of the transmission of a first transmission of the sequential transmission, wherein repK is a number of the transmitted plurality of signals, and Tslot is a duration of each slot.

3. The electronic device of claim 1, wherein the processing circuitry is further configured to:
    receive a radio resource control (RRC) signaling which indicates the duration D, and
    configure the duration D for determining the HARQ feedback information as valid or not.

4. The electronic device of claim 1, wherein the processing circuitry is further configured to transmit the plurality of signals within a single Channel Occupancy Time (COT).

5. The electronic device of claim 1, wherein the preconfigured duration D is equal to or longer than (repK−1)*Tslot, wherein repK is a number of the sequentially transmitted plurality of signals, and Tslot is a duration of each slot.

6. The electronic device of claim 1, wherein the HARQ feedback information for each of signal of the plurality of signals is associated with a common HARQ process number.

7. A communication method performed by an electronic device, the method comprising:
    receiving Downlink Control Information (DCI) from a control device;
    in response to scheduling information in the DCI, perform a sequential transmission to transmit identical user data via a plurality of signals to the control device over a plurality of consecutive slots;
    sequentially receiving plural pieces of hybrid automatic repeat request (HARQ) feedback information related to the sequentially transmitted plurality of signals, each of the plural pieces of the HARQ feedback information indicating whether a decoding of the user data of a corresponding one of the sequentially transmitted plurality of signals is successful or not, each of the plural pieces of HARQ feedback information sequentially received a preconfigured duration D after a corresponding one of the plurality of signals is transmitted;
    analyzing each of the sequentially received plural pieces of HARQ feedback information in a sequence corresponding to a corresponding arrival time;
    in a case that any of the plural pieces of HARQ feedback information is ACK, determining a first arriving piece of HARQ feedback information that is ACK as valid HARQ feedback information and terminating the sequential transmission;
    in a case that any of the plural pieces of HARQ feedback information other than HARQ feedback information corresponding to a last transmitted signal of the plurality of signals is NACK, determining that the NACK is invalid HARQ feedback information and continuing the sequential transmission; and
    only in a case that the HARQ feedback information corresponding to the last transmitted signal of the plurality of signals is NACK, determining that the NACK is valid HARQ feedback information and performing a sequential retransmission of the identical user data,
    wherein each of the plurality of signals includes a respective redundancy version in addition to the identical user data.

8. A non-transitory computer readable storage medium storing executable instructions which, when executed by a processor, perform the communication method according to claim 7.

* * * * *